US009026012B2

(12) United States Patent
Otake et al.

(10) Patent No.: US 9,026,012 B2
(45) Date of Patent: May 5, 2015

(54) DEVELOPER CARRYING MEMBER, PROCESS FOR ITS PRODUCTION, AND DEVELOPING ASSEMBLY

(71) Applicant: Canon Kabushiki Kaisha, Tokyo (JP)

(72) Inventors: Satoshi Otake, Numazu (JP); Masayoshi Shimamura, Yokohama (JP); Yasutaka Akashi, Yokohama (JP); Takuma Matsuda, Susono (JP); Minoru Ito, Susono (JP); Kazuhito Wakabayashi, Mishima (JP); Atsushi Noguchi, Numazu (JP); Hironori Mori, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 13/797,532

(22) Filed: Mar. 12, 2013

(65) Prior Publication Data

US 2013/0188999 A1    Jul. 25, 2013

Related U.S. Application Data

(63) Continuation of application No. PCT/JP2012/006624, filed on Oct. 17, 2012.

(30) Foreign Application Priority Data

Oct. 31, 2011    (JP) .................. 2011-239222

(51) Int. Cl.
  *G03G 15/09*    (2006.01)
  *C09D 5/24*    (2006.01)
  *G03G 15/08*    (2006.01)
(52) U.S. Cl.
  CPC .............. *C09D 5/24* (2013.01); *G03G 15/0818* (2013.01); *G03G 15/0812* (2013.01)

(58) Field of Classification Search
  USPC ................. 399/119, 252, 265, 267, 276, 277; 430/62, 108.23, 137.13; 492/48, 49, 492/53–56
  See application file for complete search history.

(56) References Cited

U.S. PATENT DOCUMENTS 5,585,901 A    12/1996    Watanabe et al.
6,154,625 A *    11/2000    Saiki et al. ................. 430/123.3
(Continued)

FOREIGN PATENT DOCUMENTS

JP    5-346727 A    12/1993
JP    10-326040 A    12/1998
(Continued)

OTHER PUBLICATIONS

International Preliminary Report on Patentability, International Application No. PCT/JP2012/006624, Mailing Date May 15, 2014.

*Primary Examiner* — Hoan Tran
(74) *Attorney, Agent, or Firm* — Fitzpatrick, Cella, Harper and Scinto

(57) ABSTRACT

A developer carrying member is provided the surface layer of which can make a developer stable by controlling its triboelectric charging strongly and which can maintain a high image quality over a long period of time even where a developer made highly spherical-particle or a small-particle developer is used. The developer carrying member has a substrate and a surface layer. The surface layer is a cured product of a resin composition containing a binder resin, conductive particles, a quaternary ammonium salt and an azo metal complex compound, the binder resin has in the molecular structure at least one structure selected from the group consisting of an —$NH_2$ group, an =NH group and an —NH— linkage, and the azo metal complex compound is a compound represented by the formula (1) as defined in the specification.

7 Claims, 3 Drawing Sheets

(56) References Cited

U.S. PATENT DOCUMENTS

| | | |
|---|---|---|
| 6,258,498 B1 | 7/2001 | Kawahara et al. |
| 7,361,442 B2 * | 4/2008 | Otake et al. ............... 430/122.5 |
| 8,059,997 B2 | 11/2011 | Otake et al. |
| 8,372,570 B2 | 2/2013 | Matsuda et al. |
| 8,377,549 B2 | 2/2013 | Takayama et al. |
| 8,792,810 B2 * | 7/2014 | Ito et al. ........................ 399/276 |
| 2010/0028792 A1 | 2/2010 | Otake et al. |
| 2010/0158579 A1 | 6/2010 | Kusano et al. |
| 2011/0177926 A1 | 7/2011 | Kusano et al. |
| 2011/0188900 A1 | 8/2011 | Kusano et al. |
| 2013/0129392 A1 | 5/2013 | Wakabayashi et al. |
| 2013/0216274 A1 | 8/2013 | Ito et al. |

FOREIGN PATENT DOCUMENTS

| | | |
|---|---|---|
| JP | 2002-40797 A | 2/2002 |
| JP | 2004-341456 A | 12/2004 |
| JP | 2009-298851 A | 12/2009 |
| JP | 2010-107565 A | 5/2010 |
| JP | 4734291 B2 | 7/2011 |
| WO | 2010/005058 A1 | 1/2010 |

* cited by examiner

DEVELOPER CARRYING MEMBER, PROCESS FOR ITS PRODUCTION, AND DEVELOPING ASSEMBLY

CROSS-REFERENCE TO RELATED APPLICATIONS

This application is a continuation of International Application No. PCT/JP2012/006624, filed Oct. 17, 2012, which claims the benefit of Japanese Patent Application No. 2011-239222, filed Oct. 31, 2011.

BACKGROUND OF THE INVENTION

1. Field of the Invention

This invention relates to a developer carrying member, a process for its production, and a developing assembly making use of the developer carrying member.

2. Description of the Related Art

In recent years, in order to meet a demand for making electrophotographic images higher in image quality, developers are being made smaller in particle diameter. Such developers having a small particle diameter come large in particle surface area per unit mass. Hence, the developers tend to have a large surface electric charge during the step of development. Meanwhile, in order to keep developers low consumable in quantity, spherical-particle developers have come to be used. Such developers have particle surfaces having been made smooth, compared with merely pulverized-particle developers, and tend to be electrostatically charged in excess to tend to result in an unstable charge quantity. As the result, they have a tendency to tend to cause faulty images such as sleeve ghost and density non-uniformity.

In Japanese Patent Application Laid-open No. H05-346727, a method is reported in which an iron complex compound is added to a surface layer of a developer carrying member so as to control the charge quantity of a developer.

In Japanese Patent Application Laid-open No. 2002-040797, a developer carrying member is disclosed which has a surface layer containing a specific quaternary ammonium salt and a specific phenol resin, and a method is reported by which developers made spherical-particle and developers produced by polymerization are prevented from any excess charging such as charge-up.

SUMMARY OF THE INVENTION

However, Japanese Patent Application Laid-open No. H05-346727 is what aims to improve developing performance by promoting the triboelectric charging for a developer. Hence, it has sometimes come about that a readily chargeable developer is unwantedly made to undergo charge-up.

As for the developer carrying member disclosed in Japanese Patent Application Laid-open No. 2002-040797, it can keep a developer from undergoing charge-up, and can have a further stable charge-providing performance. However, it has come about that, especially where the quaternary ammonium salt is added in a large quantity in order to keep a readily chargeable developer from being charged in excess, the surface layer increases in volume resistivity to cause sleeve ghost. Also, the surface layer may come to have a low wear resistance, thus a further improvement has been sought.

Further, in recent years, there are increasing needs for electrophotographic apparatus to maintain image density in their continuous service, to keep sleeve ghost from occurring and to keep blotchy images (spotty images or wave-pattern images, caused by faulty triboelectric charge-providing to a developer) from occurring. Under such circumstances, the performance to further control the electrostatic charging of developers by developer carrying members is sought to be made much more precise.

Accordingly, the present invention is directed to providing a developer carrying member the surface layer of which can make a developer stable by controlling its triboelectric charging and which can maintain a high image quality over a long period of time even where a developer tending to have high triboelectric charges, stated specifically, a developer made highly spherical-particle or a small-particle developer is used, and a process for producing such a developer carrying member. Further, the present invention is also directed to providing a developing assembly which contributes to stable formation of high-grade electrophotographic images over a long period of time.

According to one aspect of the present invention, there is provided a developer carrying member having a substrate and a surface layer, the surface layer being a cured product of a resin composition containing a binder resin, conductive particles, a quaternary ammonium salt and an azo metal complex compound, the binder resin having in the molecular structure at least one structure selected from the group consisting of an —$NH_2$ group, an =NH group and an —NH— linkage, and the azo metal complex compound being a compound represented by the following formula (1):

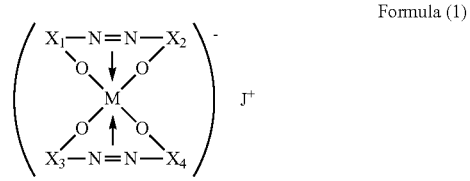

Formula (1)

In the formula (1), $X_1$, $X_2$, $X_3$ and $X_4$ each independently represent a substituted or unsubstituted phenylene group, a substituted or unsubstituted naphthylene group or a substituted or unsubstituted pyrazolene group; M represents Fe, Cr or Al; and $J^+$ represents a cation. A substituent the phenylene group, the naphthylene group and the pyrazolene group may each independently have is at least one selected from the group consisting of an alkyl group having 1 to 18 carbon atom(s), a nitro group, a halogen atom, an anilide group which may have a substituent and a phenyl group which may have a substituent, where a substituent the anilide group and the phenyl group may each independently have is at least one selected from the group consisting of an alkyl group having 1 to 18 carbon atom(s) and a halogen atom.

According to another aspect of the present invention, there is provided a developing assembly which has at least a negatively chargeable developer, a developer container in which the negatively chargeable developer is held, a developer carrying member supported rotatably which carries and transports the negatively chargeable developer thereon, and a developer layer thickness regulating member for regulating the layer thickness of a negatively chargeable developer layer formed on the developer carrying member, the developer carrying member being the developer carrying member described above.

According to the present invention, a process for producing a developer carrying member having a substrate and a surface layer is further provided which is a process for producing a developer carrying member; the process comprising the steps of; forming on the substrate a coat of a coating material containing at least a binder resin having in the molecular structure at least one structure selected from the group consisting of an —NH$_2$ group, an =NH group and an —NH— linkage, conductive particles, a quaternary ammonium salt and an azo metal complex compound represented by the above formula (1), and curing the coat to form the surface layer.

According to the present invention, a developer carrying member can be obtained the surface layer of which can make a developer stable by controlling its triboelectric charging strongly and which can provide high-grade electrophotographic images over a long period of time even where a developer tending to have high triboelectric charges, stated specifically, a developer made highly spherical-particle or a small-particle developer is used. According to the present invention, a developing assembly can also be obtained which contributes to stable formation of high-grade electrophotographic images.

Further features of the present invention will become apparent from the following description of exemplary embodiments with reference to the attached drawings.

DESCRIPTION OF THE EMBODIMENTS

Figure 1:
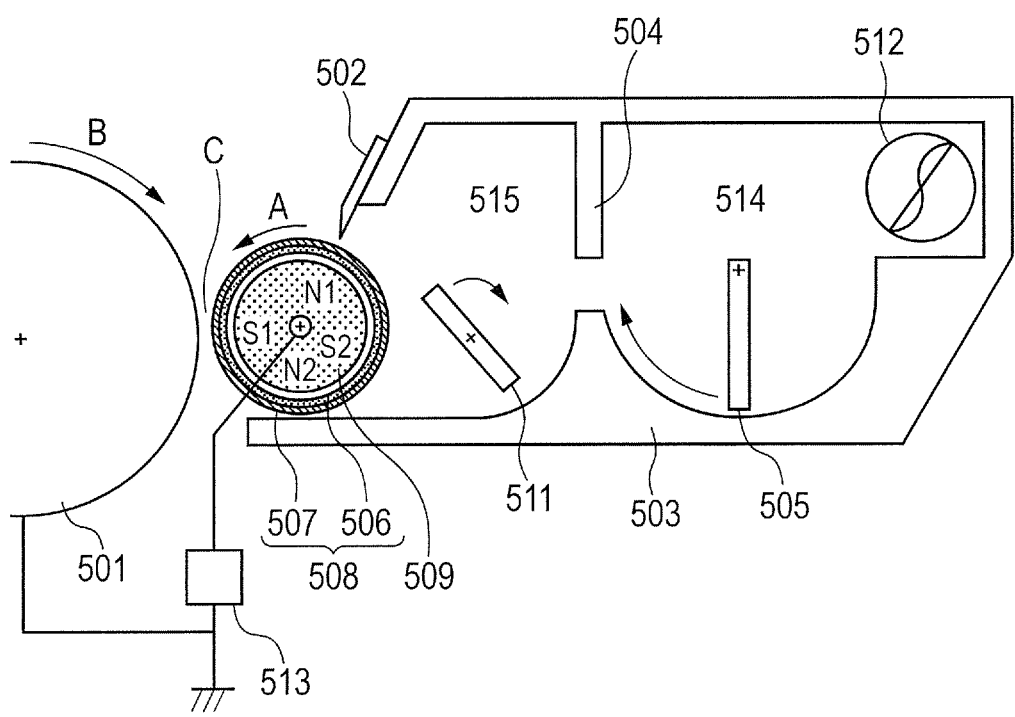
FIG. 1 is a diagrammatic view showing an example of a developing assembly making use of the developer carrying member of the present invention.

Preferred embodiments of the present invention will now be described in detail in accordance with the accompanying drawings.

The present inventors have made many studies in order to remedy a phenomena coming about when the above quaternary ammonium salt is added in a larger quantity. As the result, they have discovered that the various problems discussed above can be resolved at a high level when a specific azo metal complex compound, a quaternary ammonium salt, a resin having a specific structure and conductive particles are used in combination in the surface layer.

More specifically, the developer carrying member according to the present invention can stably provide the developer with proper triboelectric charges even in its repeated running service from the initial stage of image reproduction and also even in a variety of environments. Also, the phenomenon of charge-up, the triboelectric charging that may become unstable and an increase in developer carriage level that is attendant thereon, which tend to occur when a developer having high triboelectric charge characteristics is used, can be controlled and good developing performance can be enjoyed over a long period of time.

—Developer Carrying Member—

The developer carrying member according to the present invention has at least a substrate and a surface layer and, in addition thereto, may have, e.g., an intermediate layer (e.g., an elastic layer) between the substrate and the surface layer. The developer carrying member of the present invention may be used as a developer carrying member used in electrophotographic apparatus (a developer carrying member for electrophotographic apparatus). The surface layer may also be formed on the surface of the substrate. The developer carrying member of the present invention is described below in detail.

Substrate:

As the substrate used in the present invention, any substrate known in the field of the developer carrying member may be used, and its shape may appropriately be selected from shapes of a hollow cylinder, a solid column, a belt and the like. As this substrate, a substrate may be used which is obtained by shaping a non-magnetic metal such as aluminum, stainless steel or brass into a hollow cylinder or solid column followed by polishing or grinding.

Surface Layer:

The surface layer used in the present invention is a cured product of a resin composition containing a binder resin, conductive particles, a quaternary ammonium salt and an azo metal complex compound represented by the above formula (1). Here, this binder resin has in its molecular structure at least one structure (linkage) selected from the group consisting of an —NH$_2$ group, an =NH group and an —NH— linkage. The resin composition may also contain other additive(s) such as unevenness-providing particles described later.

The developer carrying member of the present invention has the surface layer constituted as above, and this enables the developer to be stably provided with proper triboelectric charges without being triboelectrically charged in excess when a negatively chargeable developer is used. As the result, even where a developer more highly triboelectrically chargeable than conventional ones is used, the developer can achieve triboelectric charge quantity having been made proper over a long period of time, and hence can enjoy a good developing performance.

Incidentally, where the binder resin, the azo metal complex compound and the conductive particles are used in combination in the surface layer without use of the quaternary ammonium salt, the effect of keeping the charge-up from occurring has been found to be low. On the other hand, where the binder resin, the quaternary ammonium salt and the conductive particles are used in combination in the surface layer without use of the azo metal complex compound, the effect of keeping the charge-up from occurring has been found to be obtained to a certain extent.

However, in the case when the binder resin, the quaternary ammonium salt, the azo metal complex compound and the conductive particles are used in combination as in the resin composition used in the present invention, the effect of keeping the charge-up from occurring has been found to be remarkably great, and the triboelectric charge quantity also to be very easily come stable. This effect has been found to be much greater than the effect expected from the above result obtained when either of the quaternary ammonium salt and the azo metal complex compound is used.

The mechanism by which the combination of these materials makes the charge-up kept from occurring was examined in the following way.

First, a surface layer made up by using the binder resin, the azo metal complex compound and the conductive particles but without using the quaternary ammonium salt was immersed in an organic solvent such as chloroform, in which the azo metal complex compound was soluble, to allow the azo metal complex compound to be extracted. As the result, the azo metal complex compound dissolved out in a quantity that was very small with respect to the quantity of the azo metal complex compound contained in the surface layer.

This is because the azo metal complex compound came to be incorporated in the binder resin as part of a polymer, with the curing of the binder resin, as so considered.

Subsequently, a surface layer made up by using the binder resin, the quaternary ammonium salt and the conductive particles but without using the azo metal complex compound was immersed in an organic solvent in which the azo metal complex compound was soluble, to allow the quaternary ammonium salt to be extracted. As the result, the quaternary ammonium salt dissolved out in a quantity that was very small with respect to the quantity of the quaternary ammonium salt contained in the surface layer.

This is because the quaternary ammonium salt came to be incorporated in the binder resin as part of a polymer, with the curing of the binder resin, as so considered.

Next, a surface layer made up by using the binder resin, the quaternary ammonium salt, the azo metal complex compound and the conductive particles was immersed in an organic solvent in which the azo metal complex compound was soluble. As the result, the azo metal complex compound came much extracted by tens of times to hundreds of times the above case where the quaternary ammonium salt was not added to the resin composition. This quantity in which the azo metal complex compound dissolved out was very large even when the quantities of the quaternary ammonium salt and azo metal complex compound having been added are taken into account.

This is because, though both the quaternary ammonium salt and the azo metal complex compound came to be incorporated in the binder resin as part of a polymer, with the curing of the binder resin, the quaternary ammonium salt stood incorporated selectively, as so considered.

That is, it is considered that, where the above four kinds of materials are mixed, the presence of any of the —$NH_2$ group, the =NH group and the —NH— linkage in the binder resin structure makes the quaternary ammonium salt react with the binder resin preferentially to the azo metal complex compound. The action and mechanism thereof are not known in detail, and it is considered that, as the result of preferential incorporation of the quaternary ammonium salt in the binder resin, the azo metal complex compound not incorporated in the binder resin and present singly come much present in the surface layer, and then that, in virtue of the effect of the azo metal complex compound, having negative chargeability and having ion conductivity, the developer can be kept from being charged in excess and can be improved in conductivity. This enables the developer to be vastly kept from undergoing charge-up and enables image difficulties such as sleeve ghost and blotches to be kept from occurring which are attendant on the charge-up.

Surface layer forming resin composition:
Binder Resin

As the binder resin usable in the present invention, any known resin may be used as long as it has in the molecular structure at least one structure selected from the group consisting of an —$NH_2$ group, an =NH group and an —NH— linkage (hereinafter also called "NHn structure" in some cases). Having the NHn structure in the molecular structure enables blotches, ghost and the like to be kept from occurring which are considered to be caused by excess triboelectric charging of the developer.

As specific examples of this binder resin, it may include the following: Polyurethane resins, polyamide resins, melamine resins, guanamine resins, epoxy resins making use of polyamide as a curing agent, phenol resins having the NHn structure which are produced by using a nitrogen-containing compound such as ammonia as a catalyst in their production steps, and resins having the NHn structure outside the backbone chain, such as urethane-modified epoxy resins.

Of these, the phenol resins having the NHn structure are particularly preferable in view of advantages that the triboelectric charge quantity of the developer can favorably be controlled, that the hardness of the layer having been cured is so high as to be improved in its durability with ease and that, when used as a coating material, its viscosity is relatively a little low. The nitrogen-containing compound that is a catalyst, used in such a phenol resin participates directly in polymerization reaction and exists in the phenol resin even after the reaction has been completed. It is commonly ascertained that, when, e.g., polymerized in the presence of an ammonia catalyst, an intermediate called an ammonia resol is formed, which exists in the phenol resin even after the reaction has been completed, as a structure as represented by the following formula (4).

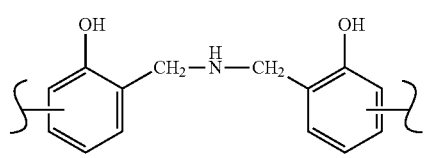

Formula (4)

The nitrogen-containing compound used in producing the phenol resins may be either of an acidic catalyst and a basic catalyst.

The binder resin in the resin composition used to form the surface layer (a surface layer forming resin composition) may preferably be in a content of 50% by mass or more from the viewpoint of the retention of a pigment to a resin layer, and 80% by mass or less from the viewpoint of resistance control of the resin layer. Also, in regard to the binder resin, its structure may be analyzed by making analysis with an analyzer for IR (infrared absorption spectroscopy) or NMR (nuclear magnetic resonance).

Quaternary Ammonium Salt

In the present invention, the quaternary ammonium salt is contained in combination with the azo metal complex compound in the resin composition, i.e., in the surface layer. This is necessary to secure a good triboelectric charge-providing performance for the developer. In particular, from the viewpoint of keeping the developer from being triboelectrically charged in excess, it is preferable that a quaternary ammonium salt positively chargeable to iron powder is contained in the resin layer, like that disclosed in, e.g., Japanese Patent Application Laid-open No. H10-326040. The iron powder given herein refers to an iron powder carrier having a volume distribution based 50% particle diameter (D50) of from 30 μm or more to 200 μm or less and being not coated with a resin.

As specific examples of this iron powder binder resin, it may include EFV200/300, trade name (available from Powder Teck Co.) and DSP138, trade name (available from Dowa Teppun K.K.). Here, the volume distribution based 50% particle diameter (D50) of the iron powder carrier may be specified by the following measuring method. It is done by fitting to a laser diffraction-scattering particle size distribution measuring instrument "MICROTRACK MT3300EX" (trade name; manufactured by Nikkiso Co. Ltd.) a sample feeder for dry-process measurement "One-shot Drying Sample Conditioner TURBOTRAC" (trade name; manufactured by Nikkiso Co. Ltd.). As feed conditions of TURBOTRAC, a dust collector is used as a vacuum source, setting air flow at liters/ second and pressure at 17 kPa. Control and analysis are automatically made by using attached software (Version 10.3.3-202D), to find the volume distribution based 50% particle diameter (D50).

As a structure of the quaternary ammonium salt used in the present invention, it may include, e.g., what is represented by the following general formula (3).

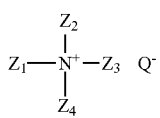
General formula (3)

In the general formula (3), $Z_1$ to $Z_4$ each independently represent an alkyl group which may have a substituent or an aryl group which may have a substituent, and $Q^-$ represents an anion. It is preferable for this alkyl group to have 1 to 18 carbon atom(s) (except for the substituent) from the viewpoint of its affinity for the binder resin. Also, the substituent the alkyl group or the aryl group may each independently have may include, e.g., a halogen group, a nitro group, a hydroxyl group and an organic acid group (e.g., a sulfonic group or a carboxyl group).

The anion represented by $Q^-$ in the general formula (3) may specifically include the following ions, which may preferably be used: Organic sulfate ions, organic sulfonate ions, organic phosphate ions, molybdate ions, tungstate ions, and heteropolyacid ions containing molybdenum atoms or tungsten atoms. Of these, from the viewpoint of keeping the developer from being triboelectrically charged in excess, it is particularly preferable for $Q^-$ to be an organic sulfonate ion.

Specific structures of a compound usable as the quaternary ammonium salt are shown in Tables 1 and 2 below.

TABLES 1 & 2

| Exemplary No. | $Z_1$ | $Z_2$ | $Z_3$ | $Z_4$ | $Q^-$ |
|---|---|---|---|---|---|
| 1 | $C_4H_9$ | $C_4H_9$ | $CH_2$—Ph | $C_4H_9$ | HO—naphthalene—$SO_3^-$ |
| 2 | $C_{12}H_{25}$ | $C_{12}H_{25}$ | $CH_3$ | $C_{12}H_{25}$ | Ph-NH—naphthalene(OH)—$SO_3^-$ |
| 3 | $C_6H_{13}$ | $C_6H_{13}$ | $CH_2$—Ph | $C_6H_{13}$ | " |
| 4 | $C_4H_9$ | $C_4H_9$ | $CH_2$—Ph | $C_4H_9$ | HO—naphthalene(HO)—$SO_3^-$ |
| 5 | $C_4H_9$ | $C_4H_9$ | $CH_2$—Ph | $C_4H_9$ | HO—naphthalene—$SO_3^-$ |
| 6 | $C_8H_{17}$ | $C_8H_{17}$ | $CH_3$ | $C_8H_{17}$ | HO—naphthalene(OH)—$SO_3^-$ |
| 7 | $C_6H_{13}$ | $C_6H_{13}$ | $CH_3$ | $C_6H_{13}$ | HO—naphthalene—$SO_3^-$ |

TABLES 1 & 2-continued

| Exemplary No. | $Z_1$ | $Z_2$ | $Z_3$ | $Z_4$ | $Q^-$ |
|---|---|---|---|---|---|
| 8 | $C_{12}H_{25}$ | $C_{12}H_{25}$ | $CH_2$—Ph | $C_{12}H_{25}$ | 6-hydroxy-4-hydroxy-naphthalene-2-sulfonate |
| 9 | $C_2H_5$ | $C_2H_5$ | $CH_2$—Ph | $C_2H_5$ | 6-hydroxy-4-hydroxy-naphthalene-2-sulfonate |
| 10 | $C_8H_{17}$ | $C_8H_{17}$ | $CH_2$—Ph | $C_8H_{17}$ | 6-hydroxy-naphthalene-2-sulfonate |
| 11 | $C_4H_9$ | $C_4H_9$ | $CH_2$—Ph | $C_4H_9$ | 4-hydroxy-naphthalene-2-sulfonate |
| 12 | $C_4H_9$ | $C_4H_9$ | $C_4H_9$ | $C_4H_9$ | 6-hydroxy-4-hydroxy-naphthalene-2-sulfonate |
| 13 | $C_8H_{17}$ | $C_8H_{17}$ | $CH_3$ | $C_8H_{17}$ | 4-hydroxy-naphthalene-1-sulfonate |
| 14 | $C_{12}H_{25}$ | $CH_3$ | $CH_2$—Ph | $CH_3$ | 4-hydroxy-naphthalene-1-sulfonate |
| 15 | $C_4H_9$ | $C_4H_9$ | $CH_2$—Ph | $C_4H_9$ | 5-hydroxy-naphthalene-1-sulfonate |
| 16 | $C_{14}H_{29}$ | $CH_3$ | $CH_3$ | $C_{14}H_{29}$ | $1/6 Mo_8O_{26}^{4-}$ |
| 17 | $C_{16}H_{33}$ | $CH_3$ | $CH_3$ | $CH_3$ | $1/6 Mo_7O_{24}^{6-}$ |
| 18 | 3-hydroxy-2-(N-ethylcarbamoyl)naphthalene | $CH_3$ | $CH_3$ | $CH_3$ | $1/6 Mo_7O_{24}^{6-}$ |
| 19 | " | $CH_3$ | $CH_3$ | $C_{16}H_{33}$ | $1/6 Mo_7O_{24}^{6-}$ |
| 20 | Ph—$CH_2$ | $CH_3$ | $CH_3$ | $CH_3$ | $1/3 Mo_{12}O_{40}O^{3-}$ |

In Tables, "Ph" represents a phenyl group.

In general, the quaternary ammonium salt is used as a positively charging charge control agent. In the present invention, however, the quaternary ammonium salt is added, together with the azo metal complex compound, to the binder resin with specific structure, thus a reverse triboelectric charge-providing performance is materialized in virtue of their mutual action. This enables the developer to retain its triboelectric charging stability while preventing the developer from undergoing charge-up on the developer carrying member and, as a result thereof, enables achievement of a good developing performance.

The presence of such a quaternary ammonium salt may be identified by, e.g., a method in which a sample taken from the surface portion of the developer carrying member by cutting or by extraction with a solvent such as chloroform is measured by GC-MS (gas chromatography-mass spectrometry) or LC-MS (liquid chromatography-mass spectrometry).

The surface layer forming resin composition may preferably have the quaternary ammonium salt in an amount of from 1 part by mass or more to 20 parts by mass or less, and much preferably from 1 part by mass or more to 10 parts by mass or less, based on 100 parts by mass of the binder resin. In the present invention, the quaternary ammonium salt acts like a catalyst for the effect of keeping the surface layer from undergoing charge-up, and hence its addition in an amount of 1 part by mass or more can easily bring the effect of keeping the charge-up from occurring. Also, its addition in an amount of 20 parts by mass or less enables the charge-up to be easily kept from occurring, while keeping the surface layer durable.

Azo Metal Complex Compound

In the present invention, the azo metal complex compound represented by the following formula (1) is contained in the surface layer. This is necessary to provide the developer with proper triboelectric charges.

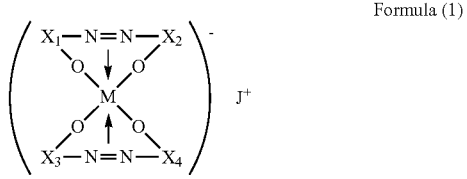

Formula (1)

In the formula (1), $X_1$, $X_2$, $X_3$ and $X_4$ each independently represent a substituted or unsubstituted phenylene group, a substituted or unsubstituted naphthylene group or a substituted or unsubstituted pyrazolene group. M represents Fe, Cr or Al. $J^+$ represents a cation. A substituent the phenylene group, the naphthylene group and the pyrazolene group may each independently have is at least one selected from the group consisting of an alkyl group having 1 to 18 carbon atom(s), a nitro group, a halogen atom, an anilide group which may have a substituent and a phenyl group which may have a substituent. A substituent the anilide group and the phenyl group may each independently have is at least one selected from the group consisting of an alkyl group having 1 to 18 carbon atom(s) and a halogen atom.

The counter ion $J^+$ in the formula (1) may include, e.g., $H^+$, an alkali metal ion, $NH_4^+$, an alkyl ammonium ion and a mixed ion of any of these.

Of the above structure, it is particularly preferable to contain in the surface layer an azo metal complex compound represented by the following formula (2), in order to make the developing performance of the developer carrying member stable in a high-temperature and high-humidity environment and in a low-temperature and low-humidity environment, without dependence on environments.

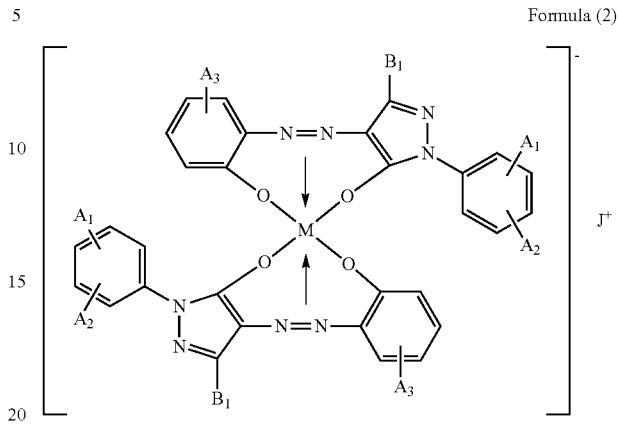

Formula (2)

In the formula (2), $A_1$, $A_2$ and $A_3$ each independently represent a hydrogen atom, an alkyl group having 1 to 18 carbon atom(s) or a halogen atom. $B_1$ represents a hydrogen atom or an alkyl group having 1 to 18 carbon atom(s). M represents Fe, Cr or Al. $J^+$ represents a cation.

Any detailed reason is unclear why the use of the azo metal complex compound represented by the formula (2) makes the developing performance of the developer carrying member stable without dependence on environments, and it is considered that this is because the azo metal complex compound, as having pyrazolone rings in the ligands, changes in its polarity to come kept from having water absorption properties. As M in the formula (2), it may particularly preferably be Fe or Cr. Setting the coordination metal to be Fe or Cr makes the azo metal complex compound improved in its dispersibility in the binder resin, and this can facilitate that the effect of keeping the charge-up from occurring is stably obtained over a long period of time.

The counter ion $J^+$ in the formula (2) may be, like that in the formula (1), $H^+$, an alkali metal ion, $NH_4^+$, an alkyl ammonium ion or a mixed ion of any of these, and may preferably be H.

The azo metal complex compound used in the present invention may preferably be used after its volume average particle diameter has been controlled to from 0.1 μm or more to 20 μm or less, and much preferably from 0.1 μm or more to 10 μm or less. Controlling this volume average particle diameter to from 0.1 μm or more to 20 μm or less enables the azo metal complex compound to be more uniformly dispersed, and this makes the surface layer have a uniform triboelectric charge-providing performance and can easily keep the image density from coming non-uniform, as being preferable.

The surface layer forming resin composition may preferably have the azo metal complex compound in an amount of from 1 part by mass or more to 40 parts by mass or less, and much preferably from 5 parts by mass or more to 40 parts by mass or less, based on 100 parts by mass of the binder resin. Its addition in an amount of 1 part by mass or more can easily bring the effect of keeping the charge-up from occurring and, its addition in an amount of 40 parts by mass or less enables the charge-up to be easily kept from occurring, while keeping the surface layer durable.

The presence of such an azo metal complex compound may also be identified by, e.g., a method in which a sample taken from the surface portion of the developer carrying member by cutting or by extraction with a solvent such as chloroform is measured by GC-MS or LC-MS.

About how to produce the azo metal complex compound used in the present invention, it may be produced by any known azo metal complex compound production method. A typical production method is described below.

First, to an amine component such as 4-chloro-2-aminophenol, a mineral acid such as hydrochloric acid or sulfuric acid is added, where, after the liquid temperature has come to 5° C. or less, sodium nitrite dissolved in water is dropwise added while maintaining the liquid temperature at 10° C. or less. The mixture obtained is stirred at 10° C. or less for 30 minutes or more to 3 hours or less to carry out reaction to make this amine component into a diazo form to obtain a diazo compound. Then, to the reaction solution obtained, sulfamic acid is added, and potassium iodide starch paper is used to make sure that any nitric acid does not remain in excess in the reaction system.

Next, separately, a coupling component such as 3-methyl-1-(3,4-dichlorophenyl)-5-pyrazolone, an aqueous sodium hydroxide solution, sodium carbonate and an organic solvent such as n-butanol are stirred (mixed) at room temperature. To the solution obtained, the above diazo compound is added, and these are stirred at room temperature for several hours to carry out coupling reaction. After the stirring, resorcinol is added to the reaction solution to make sure that no reaction takes place between the diazo compound and the resorcinol, where the reaction is set to be completed. To the reaction solution obtained, water is added, and thereafter these are thoroughly stirred and then left to stand, followed by separation. An aqueous sodium hydroxide solution is further added, followed by stirring, washing and then separation to obtain a monoazo compound.

The amine component and the coupling component may be used under appropriate selection in accordance with the molecular structure of the desired azo metal complex compound. As an organic solvent other than the n-butanol, any solvent usable in carrying out the coupling is available, and monohydric alcohol, dihydric alcohol or a ketone type organic solvent is preferred. The monohydric alcohol may include, e.g., methanol, ethanol, n-propanol, 2-propanol, isobutyl alcohol, sec-butyl alcohol, n-amyl alcohol, isoamyl alcohol, and ethylene glycol monoalkyl ethers (the alkyl group of which has 1 to 4 carbon atoms). The dihydric alcohol may include, e.g., ethylene glycol and propylene glycol. The ketone type one may include, e.g., methyl ethyl ketone and methyl isobutyl ketone.

Next, metal complexing reaction is carried out. To a n-butanol solution of the above monoazo compound, water, salicylic acid, n-butanol and sodium carbonate are added, and these are stirred. Where, e.g., iron is used as the coordination metal, an aqueous ferric chloride solution and sodium carbonate are added. The liquid temperature is raised to 30° C. or more to 40° C. or less, where the reaction is started and then the reaction is followed up by TLC (thin-layer chromatography). After 5 hours and within 10 hours from the start of the reaction, the TLC is used to make sure that raw-material spots have disappeared, where the reaction is set to be completed. After the stirring has been stopped, the reaction system is left to stand to effect separation. Further, water, n-butanol and an aqueous sodium hydroxide solution are added to carry out alkali washing. Filtration is carried out, and a solid (cake) is taken out, followed by washing with water.

Where any desired counter ion is to be provided, for example sodium hydroxide is added to water, and these are stirred while being heated, until the mixture obtained has come to have an internal temperature of 85° C. or more to 90° C. or less, where a liquid dispersion of the above cake is dropwise added thereto. This is stirred at 97° C. or more to 99° C. or less for 1 hour, followed by cooling and filtration, and thereafter the cake is washed with water. Then, the product obtained may sufficiently be dried by vacuum drying to obtain the azo metal complex compound usable in the present invention.

Conductive Particles

In order to control the resistivity of the surface layer, conductive particles are contained in the resin composition (in the surface layer). The conductive particles may be used under appropriate selection of any conductive particles known in the field of the developer carrying member. Examples of such conductive particles are shown below: Fine powder of metals (such as aluminum, copper, nickel and silver), particles of conductive metal oxides (such as antimony oxide, indium oxide, tin oxide, titanium oxide, zinc oxide, molybdenum oxide and potassium titanate), crystalline graphite, all kind of carbon fibers, and conductive carbon black. of these, conductive carbon black and crystalline graphite are particularly preferable because of their superior dispersibility and superior electrical conductivity. The above conductive particles may be used alone or in the form of a mixture of two or more types.

The conductive particles may also preferably be mixed in an amount of from 20 parts by mass or more to 100 parts by mass or less, based on 100 parts by mass of the resin (binder resin). Their addition within this range enables the surface layer to have resistivity at the desired level without damaging its strength.

The conductive particles may preferably have a volume average particle diameter of 10 nm or more from the viewpoint of dispersion stability, and 20 µm or less from the viewpoint of resistance uniformity of the resin composition.

Other Additives

The surface layer forming resin composition or rather the surface layer may preferably contain unevenness-providing particles for forming surface unevenness, from the viewpoints of providing uniform surface roughness and maintaining proper surface roughness. The unevenness-providing particles need not have any conductivity, and are added for the purpose of forming an unevenness profile on the surface of the resin composition surface layer. The unevenness-providing particles may preferably have a volume average particle diameter of 1 µm or more from the viewpoint of providing the unevenness, and 30 µm or less from the viewpoint of maintaining the durability of the resin composition surface layer. In the surface layer forming resin composition, the unevenness-providing particles may also preferably be added thereto in an amount of 5 parts by mass or more from the viewpoint of the effect to be brought by their addition, and 100 parts by mass or less from the viewpoint of maintaining wear resistance, based on 100 parts by mass of the binder resin.

Layer Thickness, Volume Resistivity and Surface Roughness of Surface Layer:

The surface layer may preferably have, as its surface roughness, an arithmetic-mean roughness Ra (JIS B 0601-2001) of from 0.3 µm or more to 2.5 µm or less, and particularly preferably from 0.4 µm or more to 2.0 µm or less. Making the resin layer surface (surface layer) have an Ra of from 0.3 µm or more to 2.5 µm or less makes the developer transportable by the developer carrying member in a more stable level. This can also make it easy for the surface layer to have good wear resistance and developer-stain resistance.

The surface layer formed in the developer carrying member of the present invention may preferably have a layer thickness of from 4 µm or more to 50 µm or less, and particularly preferably from 6 μm or more to 30 μm or less. As being 4 μm or more, the surface layer can easily cover the substrate and hence the effect of forming the surface layer can easily be obtained, and, as being 50 μm or less, the roughness of the surface layer can easily be controlled by the materials to be added thereto.

The surface layer in the present invention may preferably have a volume resistivity of from $1\times10^{-1}$ Ω·cm or more to $1\times10^{3}$ Ω·cm or less, and particularly preferably from $1\times10^{-1}$ Ω·cm or more to $1\times10^{2}$ Ω·cm or less. As being from $1\times10^{-1}$ Ω·cm or more to $1\times10^{3}$ Ω·cm or less, it is easy to make resistance control by the addition of the conductive particles to the surface layer.

—Developer Carrying Member Production Process—

In the process for producing the developer carrying member according to the present invention, a coat of a coating material containing at least the binder resin, conductive particles, quaternary ammonium salt and azo metal complex compound described above is formed on the surface of the substrate, and the coat formed is cured (or may be dried to harden) to form the surface layer. Here, when the materials for forming the surface layer are mixed, it is preferable to disperse and mix these materials in a solvent to make up a coating material, which is applied and coated on the surface of the substrate. In making the surface layer, it is preferable to use a coating material prepared by mixing the binder resin, the conductive particles, the quaternary ammonium salt and the azo metal complex compound in a solvent in which the binder resin is soluble (as exemplified by methanol or isopropyl alcohol).

To disperse and mix the above materials, a known media dispersion system such as a ball mill, a sand mill, an attritor or a bead mill, or a known medialess dispersion system that utilizes impact atomization or thin-film spin methodology, may preferably be used. Also, as a method of coating the coating material obtained, it may include known methods such as dipping, spraying, roll coating, electrostatic coating and ring coating. As a curing method, it may include, e.g., heat curing.

—Developing Assembly—

The developing assembly making use of the developer carrying member of the present invention is described next by giving examples of embodiments. Note that, the examples are by no means limited to the following embodiments. The developing assembly of the present invention has at least a negatively chargeable developer, a developer container, a developer carrying member and a developer layer thickness regulating member, and as this developer carrying member, the developer carrying member of the present invention as described above is used.

FIG. 1 is a diagrammatic view showing an example of the construction of the developing assembly of the present invention where a magnetic one-component developer is used. The developing assembly shown in FIG. 1 has a container (developer container 503) for holding the developer therein and a rotatably supported developer carrying member (developing sleeve) 508 for carrying and transporting on its surface a developer (not shown) kept held in the container. This developer carrying member 508 has a substrate 506 and a surface layer 507 formed on the substrate. In the interior of this developing sleeve 508, a magnet (a magnet roller) 509 having magnetic poles (N1, N2, S1 and S2) is provided so that the magnetic one-component developer can magnetically be attracted to and held on the developer carrying member 508.

Meanwhile, the magnetic one-component developer is sent into the developer container 503 from a developer supply container (not shown) via a developer feed member 512. The developer container 503 is divided into a first chamber 514 and a second chamber 515, where the magnetic one-component developer having been sent into the first chamber 514 is sent to the second chamber 515 by the aid of an agitating transport member 505, passing through an opening formed by the developer container 503 and a partition member 504. The second chamber 515 is provided therein with an agitating transport member 511 for preventing the developer from stagnating.

In this developing assembly, first, the magnetic one-component developer held in the developer container 503 is held on the developer carrying member 508 by the magnetic force of the magnet roller 509 has, and a developer layer is formed on the developer carrying member 508 by the aid of a developer layer thickness regulating member 502. Then, by the rotation of the developer carrying member 508 in the direction of an arrow A, the developer on the developer carrying member 508 is transported to a developing zone C where the developer carrying member 508 and an electrostatic latent image bearing member (photosensitive drum) 501 face each other. Then, an electrostatic latent image formed on the electrostatic latent image bearing member 501 is developed with the developer to form a developer image thereon. During this course, the photosensitive drum 501 is rotated in the direction of an arrow B.

The magnetic one-component developer gains triboelectric charges which enable development of the electrostatic latent image formed on the photosensitive drum 501, as a result of the friction between magnetic developer particles one another and between these and the surface layer at the surface of the developer carrying member. In order to control the thickness of the developer transported to the developing zone C, a magnetic blade 502 is fitted which is made of a ferromagnetic metal, serving as the developer layer thickness regulating member. The magnetic blade 502 is fitted to the developer container 503 usually in such a way as to face the developer carrying member 508 leaving a gap of from 50 μm or more to 500 μm or less from the surface of the developer carrying member 508. The magnetic line of force exerted from the magnetic pole N1 of the magnet roller 509 is converged to the magnetic blade 502, whereby a thin layer of the magnetic one-component developer is formed on the developer carrying member 508. Incidentally, in the present invention, a non-magnetic developer layer thickness regulating member may also be used in place of the magnetic blade 502.

From the viewpoint of high image quality, the thickness of the magnetic one-component developer layer thus formed on the developer carrying member 508 may preferably be smaller than the minimum gap between the developer carrying member 508 and the photosensitive drum 501 in the developing zone C.

It is effective for the developer carrying member of the present invention to be set in a developing assembly of a system in which electrostatic latent images are developed with the magnetic one-component developer as above, i.e., a non-contact developing assembly.

In order to cause to fly the magnetic one-component developer held on the developer carrying member 508, a development bias voltage is applied to the developer carrying member 508 by a development bias power source 513 serving as a bias applying means. When a direct-current voltage is used as this development bias voltage, it is preferable to apply to the developer carrying member 508 a voltage which corresponds to a value intermediate between the potential at image areas of the electrostatic latent image (the region rendered visible upon attraction of the developer) and the potential at background areas.

In order to enhance the density of images to be formed by development and improve the gradation thereof, an alternating bias voltage may be applied to the developer carrying member 508 to form in the developing zone C a vibrating electric field whose direction alternately reverses. In such a case, an alternating bias voltage formed by superimposing thereon a direct-current voltage component having a value intermediate between the potential at developing image areas and the potential at back ground areas as above may preferably be applied to the developer carrying member 508.

Figure 2:
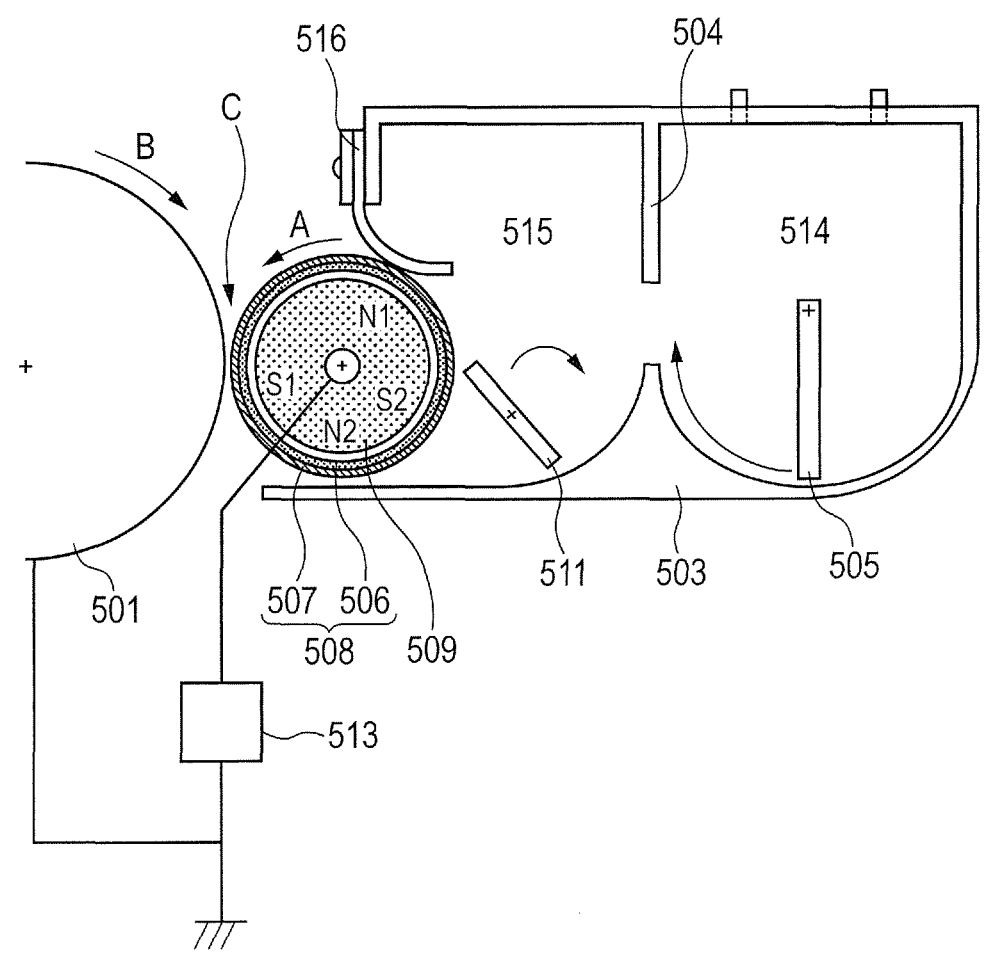
FIG. 2 is a diagrammatic view showing another example of a developing assembly making use of the developer carrying member of the present invention.

FIG. 2 is a diagrammatic view showing another example of the construction of the developing assembly of the present invention, making use of a magnetic one-component developer. In what is shown in FIG. 1, the magnetic blade 502, which is so disposed as to be set apart from the developer carrying member 508, is used as the developer layer thickness regulating member which controls the thickness of the magnetic one-component developer held on the developer carrying member 508. Meanwhile, in what is shown in FIG. 2, an elastic blade 516 is used as the developer layer thickness regulating member. This elastic blade 516 may be brought into contact or pressure touch with the developer carrying member 508 through the magnetic one-component developer. Thus, the developing assembly to which the developer carrying member of the present invention is fitted may make use of such a magnetic blade disposed being set apart from the developer carrying member or such an elastic blade disposable in touch with the developer carrying member through the developer, as the developer layer thickness regulating member.

This elastic blade 516 may be composed of, e.g., a material having a rubber elasticity, such as urethane rubber or silicone rubber, or a material having a metal elasticity, such as bronze or stainless steel.

Figure 3:
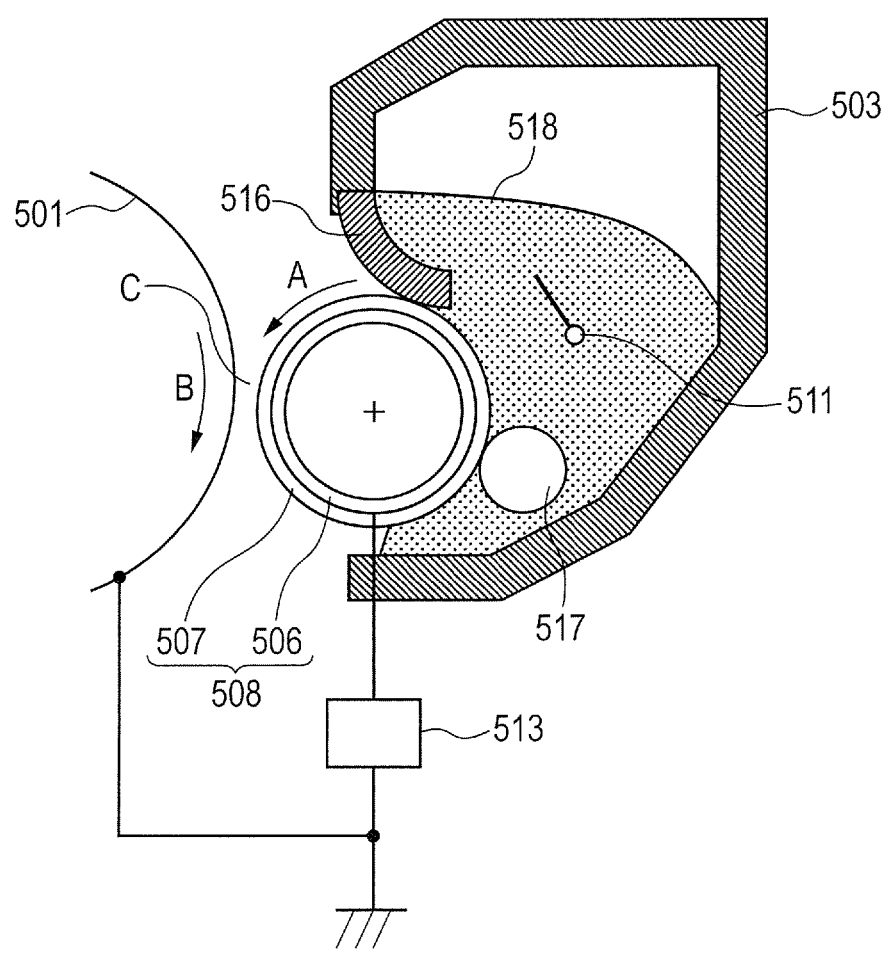
FIG. 3 is a diagrammatic view showing still another example of a developing assembly making use of the developer carrying member of the present invention.

FIG. 3 is a diagrammatic view showing an example of the construction of a non-magnetic one-component developing assembly making use of the developer carrying member of the present invention. In the assembly shown in FIG. 3, an electrostatic latent image bearing member (photosensitive drum) 501 which holds thereon an electrostatic latent image formed by a known process is rotated in the direction of an arrow B. A developing sleeve 508 as the developer carrying member is constituted of a substrate (cylindrical tube made of a metal) 506 and a surface layer 507 formed on the former's surface. Since a non-magnetic one-component developer is used, any magnet is not provided inside the substrate 506. In place of the metal cylindrical tube as the substrate 506, a solid columnar member may be used.

Inside a developer container 503, an agitating transport member 511 for agitating and transporting a non-magnetic one-component developer 518 is provided.

A developer feed/stripping member 517 for feeding the developer 518 to the developing sleeve 508 and also stripping off the developer 518 remaining on the surface of the developing sleeve 508 after development is kept in contact with the developing sleeve 508. As the developer feed/stripping member (developer feed/stripping roller) 517 is rotated in the same direction as the developing sleeve 508 (the direction of A), the surface of the developer feed/stripping roller 517 moves in the direction counter to (reverse direction of) the surface movement of the developing sleeve 508. Thus, the non-magnetic one-component developer 518 is fed onto the developing sleeve 508 inside the developer container 503.

The developing sleeve 508 carries the non-magnetic one-component developer thus fed and is rotated in the direction of an arrow A to transport the non-magnetic one-component developer to a developing zone C where the developing sleeve 508 and the photosensitive drum 501 face each other. The layer thickness of the non-magnetic one-component developer held on the developing sleeve 508 is regulated by a developer layer thickness regulating member 516 coming into pressure touch with the surface of the developing sleeve 508 through the developer layer.

The non-magnetic one-component developer 518 gains triboelectric charges that are enough to develop the electrostatic latent image formed on the photosensitive drum 501, as a result of its friction with the developing sleeve 508. In the following description, to avoid complicacy of description, a non-contact developing assembly is taken as an example.

In order to cause to fly the non-magnetic one-component developer held on the developing sleeve 508, a development bias voltage is applied to the developing sleeve 508 from a development bias power source 513. When a direct-current voltage is used as this development bias voltage, a voltage having a value intermediate between the potential at electrostatic latent image areas (the region rendered visible upon attraction of the non-magnetic developer 518) and the potential at back ground areas may preferably be applied to the developing sleeve 508. In order to enhance the density of images to be formed by development and improve the gradation thereof, an alternating bias voltage may be applied to the developing sleeve 508 to form in the developing zone C a vibrating electric field whose direction alternately reverses. In such a case, an alternating bias voltage formed by superimposing a direct-current voltage component having a value intermediate between the potential at image areas and the potential at back ground areas may preferably be applied to the developing sleeve 508.

As the developer feed/stripping member 517, it is preferable to use an elastic roller member made of resin, rubber or sponge. In place of such an elastic roller, a belt member or a brush member may also be used as the developer feed/stripping member 517. Where a developer feed/stripping roller 517 formed of such an elastic roller is used as the developer feed/stripping member, the developer feed/stripping roller 517 may be rotated in the same direction as or in the direction counter to the developing sleeve, either of which may appropriately be selected. Usually, in view of stripping performance and feed performance, it is much preferable for it to be rotated in the counter direction.

The developer feed/stripping member 517 may have a level of penetration to the developing sleeve 508, of from 0.5 mm or more to 2.5 mm or less. This is preferable in view of the feed performance and stripping performance of the developer. This level of penetration is the value (length) that is found when the distance between the center of the developer feed/stripping member 517 and the center of the developing sleeve 508 after they come into contact is subtracted from the value found by dividing by 2 the sum of the external diameter of the member 517 and the external diameter of the sleeve 508 before they come into contact.

In the developing assembly shown in FIG. 3, an elastic blade 516 made of a material having a rubber elasticity, such as urethane rubber or silicone rubber, or a material having a metal elasticity, such as bronze or stainless steel, may be used as a developer layer thickness regulating member. This elastic blade 516 is brought into pressure touch with the developing sleeve 508 in such a state that it bends in the direction reverse to the rotational direction of the developing sleeve 508.

Incidentally, besides the developer layer thickness regulating member for regulating the layer thickness of the negatively chargeable developer layer, the developing assembly making use of the developer carrying member of the present invention may appropriately be changed in the shape of the developer container 503, the presence of the agitating transport member 505 or 511, the disposition of the magnetic poles, the shape of the developer feed member 512, the presence of the developer supply container, and so forth.

—Developer—

The developer (toner) usable in the developing assembly making use of the developer carrying member of the present invention is negatively chargeable. Also, this negatively chargeable developer makes use of conventionally known materials (e.g., components such as a binder resin, a charge control agent, a magnetic material, a colorant, a releasing agent and an inorganic fine powder), and may be obtained by a conventionally known production process, without any particular limitations.

Particles (developer particles) constituting the developer used in the present invention may preferably have a weight average particle diameter in the range of from 4.0 μm or more to 8.0 μm or less. The use of such a developer enables image quality and image density to be well balanced with ease. Stated specifically, as being 4.0 μm or more in weight average particle diameter, the quantity of a magnetic powder to be contained in each particle of the developer can be smaller, and this makes it easy to keep fog from occurring, while keeping the developer from agglomerating. Also, as being 8.0 μm or less in weight average particle diameter, each-dot reproducibility can be kept high-grade while keeping the developer from agglomerating, and this makes it easy to achieve high image quality.

In order to achieve stable image density and image quality, the above developer may also preferably have particles that are more closely spherical, namely, developer particles having an average circularity close to 1.0. Stated specifically, in circularity distribution of magnetic developer particles, particles having a circularity relatively as high as 0.93 or more may preferably be contained in the developer in a proportion of 60% by number or more, and much preferably 75% by number or more. As being 60% by number or more, phenomena such as a lowering of triboelectric charge quantity and a staining of the developer carrying member can not easily come about, and the image density can not easily come to lower.

As the binder resin, any commonly known resin may be used, which may include, e.g., vinyl resins, polyester resins, polyurethane resins, epoxy resins and phenol resins. In particular, vinyl resins or polyester resins are preferable from the viewpoint of developing performance and fixing performance.

For the purpose of improving triboelectric charge characteristics, a charge control agent may be used by incorporating it in developer particles (internal addition) or blending it with developer particles (external addition). Such addition of the charge control agent enables easy control of triboelectric charge quantity in accordance with developing systems.

Where the developer is a magnetic developer, a magnetic material therefor may include, e.g., iron oxide type metal oxides such as magnetite, maghemite and ferrite; and magnetic metals such as Fe, Co and Ni, or alloys of any of these metals with any of metals such as Al, Co, Cu, Pb, Mg, Ni, Sn, Zn, Sb, Be, Bi, Cd, Ca, Mn, Se, Ti, W and V, and mixtures of any of these; any of which may be mixed. Here, any of these magnetic materials may be made to serve also as a colorant.

As a colorant to be mixed in the developer, any conventionally known pigment or dye may be used.

A release agent may preferably be mixed in the developer from the viewpoint of, e.g., preventing the developer from sticking to the fixing assembly. As the release agent, Fischer-Tropsch wax may be used, for example.

In order to improve environmental stability, charging stability, developing performance, fluidity and storage stability and to improve cleaning performance, it is further preferable to externally add to developer particles an inorganic fine powder such as silica, titanium oxide or alumina powder. In particular, fine silica powder is much preferred.

EXAMPLES

The present invention is described below in greater detail by giving working examples, to which, however, the present invention is by no means limited. How to measure various physical properties is described first.

—Measuring Methods—

(1) Measurement of Arithmetic-Mean Roughness (Ra) of Developer Carrying Member Surface:

The arithmetic-mean roughness (Ra) of the developer carrying member surface may be measured in the following way. That is, it is measured according to JIS B0601 (2001) "Surface Roughness", using SURFCORDER SE-3500 (trade name), manufactured by Kosaka Laboratory, Ltd., and under measurement conditions of a cut-off of 0.8 mm, an evaluation length of 8 mm and a feed rate of 0.5 mm/s. Measured at the positions of 3 spots in total which are at the middle (1 spot) of the developer carrying member in its axial direction and intermediate points (2 spots) between the middle and the both end portions of the developer carrying member in its axial direction, further likewise 3 spots which are on the same developer carrying member having been rotated by 90° in the peripheral direction, and still further likewise 3 spots which are on the same developer carrying member having been further rotated by 90°. Then, the Ra is measured at each of these 9 spots in total, and their arithmetic-mean value is taken as the arithmetic-mean roughness of the developer carrying member surface.

(2) Measurement of Volume Resistivity of Developer Carrying Member Surface Layer:

A coat layer (surface layer) of 7 μm or more to 20 μm or less thick is formed on a polyethylene terephthalate (PET) sheet of 100 μm thick, and its volume resistivity is measured with a resistivity meter LORESTAR AP (trade name; manufactured by Mitsubishi Chemical Corporation), using a four-terminal probe. It is measured in an environment of a temperature of 20° C. or more to 25° C. or less and a humidity of 50% RH or more to 60% RH or less.

(3) Measurement of Layer Thickness and Wear Depth of Surface Layer:

Using a dimension measuring instrument "LS-5000 Series" (trade name), manufactured by Keyence Corporation, which measures the outer diameter of a cylinder by using laser light, the outer diameter ($S_0$) of a developer carrying member before formation of the surface layer thereon, the outer diameter ($S_1$) thereof after formation of the surface layer thereon and the outer diameter ($S_2$) thereof after running service (running service conditions are appropriately set) are each measured. From these measured values, surface layer thickness ($S_1$-$S_0$) and surface layer wear depth (film wear) ($S_1$-$S_2$) are calculated.

To measure these, a controller "LS-5500" (trade name) and a sensor head "LS-5040T" (trade name) are used which are of the above measuring instrument. A sensor is separately fastened to an instrument fitted with a developer carrying member fastening jig and a sleeve feed mechanism, where the outer diameter size of the developer carrying member is measured at 30 spots on the developer carrying member divided into 30 areas in its lengthwise direction, and further at 30 spots after the sleeve is rotated by 90 degrees in the peripheral direction, 60 spots in total. The outer diameter size is the average value of measured values thus found, which are measured in an environment of a temperature of 20° C. or more to 25° C. or less and a humidity of 50% RH or more to 60% RH or less. Here, the outer diameter size of the developer carrying member after running service is measured after any developer melt-stuck matter standing adherent or melt-stuck onto the surface has been removed by ultrasonic cleaning in methyl ethyl ketone for 1 minute.

(4) Measurement of Volume Average Particle Diameters of Conductive Particles and Unevenness-Providing Particles:

The particle diameters of the conductive particles and of the particles in coating materials (e.g., unevenness-providing particles), used in forming the surface layer may be measured with a laser diffraction particle size distribution meter COULTER LS-230 Particle Size Distribution Meter (trade name; manufactured by Beckman Coulter, Inc.). As a measuring method, a small-level module is used and, as a measuring solvent, isopropyl alcohol (IPA) is used. The inside of a measuring system of the particle size distribution meter is washed with the IPA for about 5 minutes, and background function is executed after the washing. Next, 1 mg of a measuring sample is added to 50 ml of IPA. The sample suspension obtained is subjected to dispersion by means of an ultrasonic dispersion machine for about 1 minute to obtain a sample fluid. Thereafter, the sample fluid is slowly added to the interior of the measuring system of the measuring instrument, and the sample concentration in the measuring system is so adjusted as to be 45% or more to 55% or less as PIDS (polarization intensity differential scattering) on the screen of the instrument, to make measurement to determine volume average particle diameter calculated from volume distribution.

(5) Measurement of Volume Average Particle Diameter Of Azo Metal Complex Compound:

About 20 mg of the azo metal complex compound is added to a solution composed of 2 ml of a surface-active agent SCOREROL 100 (trade name; available from Kao Corporation) and 20 ml of water, to prepare a liquid mixture. Subsequently, about 1 ml of this liquid mixture is added to about 120 ml of dispersion water held in a particle size distribution measuring instrument LA-910 (trade name; manufactured by Horiba Ltd.), and, after ultrasonic vibration has been carried out for 1 minute, the particle size distribution is measured.

(6) Measurement of Particle Diameter of Developer Particles:

COULTER MULTISIZER II (trade name; manufactured by Beckman Coulter, Inc.) is used as a measuring instrument. As an electrolytic solution, an aqueous about 1% by mass NaCl solution is prepared using first-grade sodium chloride. To 100 ml of this aqueous electrolytic solution, 0.5 ml of a surface-active agent, preferably an alkylbenzenesulfonate, is added as a dispersant, and further 10 mg of a measuring sample (developer) is added. The electrolytic solution in which the sample has been suspended is subjected to dispersion for about 1 minute in an ultrasonic dispersion machine. The volume and number of the measuring sample are measure to calculate its volume distribution and number distribution, by means of the above measuring instrument and using a 100 μm aperture or 30 μm aperture as its aperture. From the results obtained, weight-base weight average particle diameter (D4) (the middle value of each channel is used as the representative value for each channel) determined from volume distribution is determined.

(7) Measurement of Average Circularity of Developer Particles:

The average circularity of developer particles is measured with a flow type particle image analyzer FPIA-3000 (trade name; manufactured by Sysmex Corporation) and under conditions for the measurement and analysis at the time of correction operation.

A specific measuring method is as follows: First, about 20 ml of ion-exchanged water, from which impurity solid matter and the like have beforehand been removed, is put into a container made of glass. To this water, about 0.2 ml of a dilute solution is added as a dispersant, which is prepared by diluting "CONTAMINON N" (trade name; an aqueous 10% by mass solution of a pH 7 neutral detergent for washing precision measuring instruments which is composed of a nonionic surface-active agent, an anionic surface-active agent and an organic builder and is available from Wako Pure Chemical Industries, Ltd.) with ion-exchanged water to about 3-fold by mass. Further, about 0.02 g of a measuring sample (developer) is added, followed by dispersion treatment for 2 minutes by means of an ultrasonic dispersion machine to prepare a liquid dispersion for measurement. In that course, the dispersion system is appropriately so cooled that the liquid dispersion has a temperature of 10° C. or more to 40° C. or less.

As the ultrasonic dispersion machine, a desk-top ultrasonic washer dispersion machine, e.g., VS-150 (trade name; manufactured by Velvo-Clear Co.) is used which is of kHz in oscillation frequency and 150 W in electric output. Into its water tank, a stated amount of ion-exchanged water is put, and about 2 ml of the above CONTAMINON N is fed into this water tank.

In the measurement, the flow type particle image analyzer is used, having an objective lens "UPlanApro" (trade name; magnification: 10 times; number of aperture: 0.40), and a particle sheath "PSE-900A" (trade name; available from Sysmex Corporation) is used as a sheath solution. The liquid dispersion having been controlled according to the above procedure is introduced into the flow type particle analyzer, where 3,000 developer particles are counted in an HPE measuring mode and in a total count mode. Then, the binary-coded threshold value at the time of particle analysis is set to 85% and the diameter of particles to be analyzed are limited to circle-equivalent diameter of from 1.985 μm or more to less than 39.69 μm, where the average circularity of developer particles is determined.

In the measurement, before the measurement is started, autofocus control is performed using standard latex particles (e.g., "RESEARCH AND TEST PARTICLES Latex Microsphere Suspensions 5200A", trade name; available from Duke Scientific Corporation; having been diluted with ion-exchanged water). Thereafter, the autofocus control may preferably be performed at intervals of 2 hours after the measurement has been started.

In working examples given later, a flow type particle image analyzer is used on which correction is operated by Sysmex Corporation and for which a correction certificate issued by Sysmex Corporation is issued. Measurement is made under the measurement and analysis conditions set when the correction certificate is received, except that the diameters of particles to be analyzed are limited to the circle-equivalent diameter of from 1.985 μm or more to less than 39.69 μm.

(8) Measurement of Glass Transition Point (Tg) of Binder Resin and Melting Point of Wax, Used in Toner:

Peak temperatures of maximum endothermic peaks of the wax and toner are measured according to ASTM D3418-82, using a differential scanning calorimetry analyzer "Q1000" (trade name; manufactured by TA Instruments Japan Ltd.).

The temperature at the detecting portion of the instrument is corrected on the basis of melting points of indium and zinc, and the amount of heat is corrected on the basis of heat of fusion of indium.

Stated specifically, about 10 mg of the toner is precisely weighed, and this is put into a pan made of aluminum and an empty pan made of aluminum is used as reference. Measurement is made at a heating rate of 10° C./min within the measurement temperature range of from 30° C. to 200° C. Here, in the measurement, the toner is first heated to 200° C., then cooled to 30° C. and thereafter heated again. In the course of this second-time heating, a maximum endothermic peak of a DSC curve in the temperature range of from 30° C. to 200° C. is taken as a maximum endothermic peak of the toner used in the present invention, in its DSC measurement. In that case, changes in specific heat are also found within the range of temperature of from 40° C. to 100° C. The point at which the middle-point line between the base lines of a differential thermal curve before and after the appearance of the changes in specific heat thus found and the differential thermal curve intersect is regarded as the glass transition temperature Tg of the binder resin.

(9) Measurement of Magnetic Properties of Magnetic Iron Oxide Particles Used in Developer:

Magnetic properties of the magnetic iron oxide particles are measured with use of a vibration sample type magnetic-force meter (trade name: VSM P7; manufactured by Toei Industry, Co., Ltd.) at a sample temperature of 25° C. and under application of an external magnetic field of 795.8 kA/m.

(10) Measurement of Average Primary Particle Diameters of Magnetic Iron Oxide Particles, Silica Particles and Titanium Oxide Particles, Used in Developer:

The average primary particle diameters of these particles may be specified by observing the respective particles on a scanning electron microscope (40,000 magnifications) and measuring Ferret's diameters of 200 particles for the respective particles to determine their number-average particle diameters. In working examples given later, S-4700 (trade name: manufactured by Hitachi Ltd.) was used as the scanning electron microscope.

Azo Metal Complex Compound, Etc:

As the azo metal complex compound and the other complex which are used in the surface layer of the developer carrying member, the following complexes A-1 to A-8 and a-1 were used.

Preparation of Complex A-1

10 parts by mass of 4-chloro-2-aminophenol was added to a mixture of 76.5 parts by mass of water and 15.2 parts by mass of 35% by mass hydrochloric acid, and these were stirred under cooling to prepare an aqueous amine solution. This aqueous amine solution was cooled with ice and was so maintained as to be at 0° C. or more to 5° C. or less, where 13.6 parts by mass of sodium nitrite dissolved in 24.6 parts by mass of water was dropwise added to the aqueous amine solution thus cooled, followed by stirring for 2 hours to make it into a diazo form. Sulfamic acid was added thereto to make excess nitrous acid disappear, followed by filtration to make up a diazo solution.

Next, 12.0 parts by mass of 3-methyl-1-(3,4-dichlorophenyl)-5-pyrazolone was added to and dissolved in a solution of mixture of 87 parts by mass of water, 12.1 parts by mass of an aqueous 25% by mass sodium hydroxide solution, 4.9 parts by mass of sodium carbonate and 104.6 parts by mass of n-butanol. To the solution obtained, the above diazo solution was added, and these were stirred at 20° C. or more to 22° C. or less for 4 hours to carry out coupling reaction.

Thereafter, to the reaction solution, 92.8 parts by mass of water and 43.5 parts by mass of an aqueous 25% by mass sodium hydroxide solution were added, and these were stirred and washed to separate and remove the lower-layer water layer.

Next, 42.2 parts by mass of water, 5.9 parts by mass of salicylic acid, 24.6 parts by mass of butanol and 48.5 parts by mass of an aqueous 15% by mass sodium carbonate solution were added to and stirred into the reaction solution treated as above. Further, 15.1 parts by mass of an aqueous 38% by mass ferric chloride solution and 18.0 parts by mass of an aqueous 15% by mass sodium carbonate solution were added, and the pH was adjusted with acetic acid to 4.5. The liquid temperature was raised to 30° C., followed by stirring for 8 hours to carry out complexing reaction. After the stirring was stopped, the reaction product obtained was left to stand to separate out the lower-part water layer. Further, to the reaction product thus treated, 189.9 parts by mass of water was added, and these were stirred and washed to separate out the lower-part water layer. After filtration, the cake formed was washed with 253 parts by mass of water. After this was vacuum-dried at 60° C. for 24 hours, a complex A-1 was obtained.

The structure of the complex A-1 was analyzed by using infrared absorption spectroscopy, visible-light absorption spectroscopy, elementary analysis (C, H, N), atomic-absorption spectroscopy and mass spectrometry, so that this complex A-1 was identified as a compound having a structure wherein $A_1$ to $A_3$, $B_1$, M and J in the formula (2) were those shown in Table 3. The volume average particle diameter of the complex A-1 as measured by the method describe above is also shown in Table 3. Also, in Table 3, as to the sites of bond of $A_1$ and $A_2$, the positions of bond of their respective substituents on the phenyl groups shown in the formula (2) and, as to the site of bond of $A_3$, the position of bond thereof on the phenylene group shown in the formula (2) are entered according to IUPAC nomenclature.

Preparation of Complex A-2

A complex A-2 was obtained in the same way as the complex A-1 except that, in the method of making the complex A-1, the 3-methyl-1-(3,4-dichlorophenyl)-5-pyrazolone was changed for 3-methyl-1-phenyl-5-pyrazolone and the aqueous ferric chloride solution used for the complexing reaction was changed for an aqueous chromium sulfate solution.

The structure of the complex A-2 was analyzed by using infrared absorption spectroscopy, visible-light absorption spectroscopy, elementary analysis (C, H, N), atomic-absorption spectroscopy and mass spectrometry, so that this complex A-2 was identified as a compound having a structure wherein $A_1$ to $A_3$, $B_1$, M and J in the formula (2) were those shown in Table 3. The volume average particle diameter of the complex A-2 obtained is also shown in Table 3.

Complex A-3

As a complex A-3, an azo iron complex represented by the following formula (5) (trade name: T-77; available from Hodogaya Chemical Co., Ltd.) was used. In the following formula, the value of a+b+c is 1. The volume average particle diameter of the complex A-3 is also shown in Table 3.

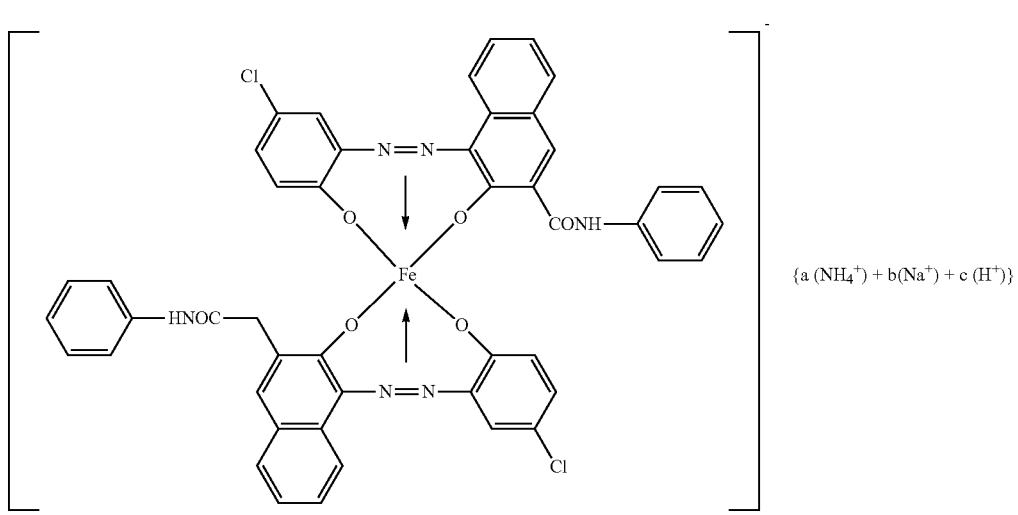

Formula (5)

$\{a (NH_4^+) + b(Na^+) + c (H^+)\}$

Complex A-4

As a complex A-4, an azo chromium complex represented by the following formula (6) (trade name: T-95; available from Hodogaya Chemical Co., Ltd.) was used. The volume average particle diameter of the complex A-4 is also shown in Table 3.

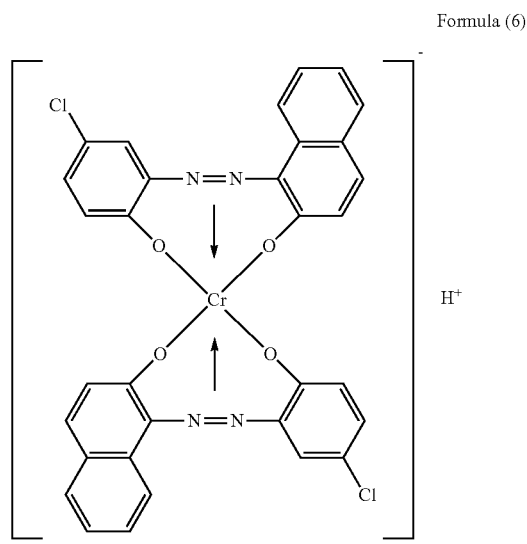

Formula (6)

$H^+$

Preparation of Complex A-5

A complex A-5 was obtained in the same way as the complex A-1 except that, in the method of making the complex A-1, the 3-methyl-1-(3,4-dichlorophenyl)-5-pyrazolone was changed for 3-methyl-1-phenyl-5-pyrazolone and the aqueous ferric chloride solution used for the complexing reaction was changed for an aqueous aluminum chloride solution.

The structure of the complex A-5 was analyzed by using infrared absorption spectroscopy, visible-light absorption spectroscopy, elementary analysis (C, H, N), atomic-absorption spectroscopy and mass spectrometry, so that this complex A-5 was identified as a compound having a structure wherein $A_1$ to $A_3$, $B_1$, M and J in the formula (2) were those shown in Table 3. The volume average particle diameter of the complex A-5 obtained is also shown in Table 3.

Preparation of Complex A-6

A complex A-6 was obtained in the same way as the complex A-1 except that, in the method of making the complex A-1, the 3-methyl-1-(3,4-dichlorophenyl)-5-pyrazolone was changed for 3-methyl-1-(3,4-dinitrophenyl)-5-pyrazolone.

The structure of the complex A-6 was analyzed by using infrared absorption spectroscopy, visible-light absorption spectroscopy, elementary analysis (C, H, N), atomic-absorption spectroscopy and mass spectrometry, so that this complex A-6 was identified as a compound having a structure wherein $A_1$ to $A_3$, $B_1$, M and J in the formula (2) were those shown in Table 3. The volume average particle diameter of the complex A-6 obtained is also shown in Table 3.

Preparation of Complex A-7

Coupling reaction was carried out in the same way as the complex A-1. To the reaction solution obtained, 42.2 parts by mass of water, 5.9 parts by mass of salicylic acid, 24.6 parts by mass of n-butanol and 48.5 parts by mass of an aqueous 15% by mass sodium carbonate solution were added. Further, 15.1 parts by mass of an aqueous 38% by mass ferric chloride solution and 48.5 parts by mass of an aqueous 15% by mass sodium carbonate solution were added, and the internal temperature was raised to 30° C., followed by stirring for 8 hours to carry out complexing reaction. After the stirring was stopped, the reaction product obtained was left to stand to separate out the lower-part water layer. Further, to the reaction product thus treated, 92.8 parts by mass of water, 12.3 parts by mass of n-butanol and 8.7 parts by mass of an aqueous 25% by mass sodium hydroxide solution were added, and these were stirred and washed to separate out the lower-part water layer. Filtration was carried out to take out a complex compound, followed by washing with 253 parts by mass of water.

To 82.3 parts by mass of water, 2.9 parts by mass of sodium sulfate was added, and these were stirred while raising temperature. To the mixture formed, at a point where its internal temperature came to be 90° C., a liquid mixture prepared by dispersing in 113.9 parts by mass of water the complex compound washed as above was dropwise added through a pipette. The mixture obtained was stirred for 1 hour while evaporating the n-butanol at 97° C. or more to 99° C. or less.

After cooling and filtration, the cake obtained was washed with 253 parts by mass of water. After this was vacuum-dried at 60° C. for 24 hours, a complex A-7 was obtained.

The structure of the complex A-7 was analyzed by using infrared absorption spectroscopy, visible-light absorption spectroscopy, elementary analysis (C, H, N), atomic-absorption spectroscopy and mass spectrometry, so that this complex A-7 was identified as a compound having a structure wherein $A_1$ to $A_3$, $B_1$, M and J in the formula (2) were those shown in Table 3. The volume average particle diameter of the complex A-7 obtained is also shown in Table 3.

Preparation of Complex A-8

A complex A-8 represented by the following formula (7) was obtained in the same way as the complex A-1 except that, in the method of making the complex A-1, the 3-methyl-1-(3,4-dichlorophenyl)-5-pyrazolone was changed for 1-(2-naphthyl)-1,1,3,3-tetramethylbutane and the aqueous ferric chloride solution used for the complexing reaction was changed for an aqueous chromium sulfate solution. The volume average particle diameter of the complex A-8 is also shown in Table 3.

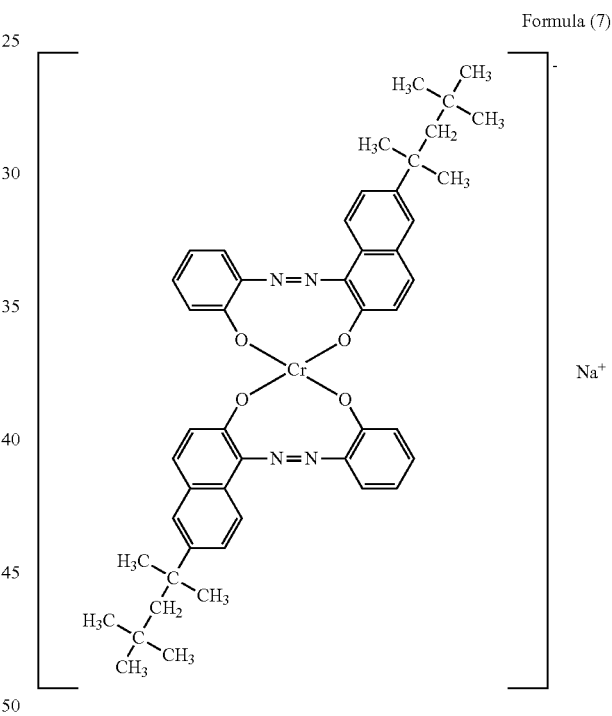

Formula (7)

Complex a-1

As a complex a-1, diammonium iridium hexachloride (available from Mitsuwa Chemicals Co., Ltd.) was used.

TABLE 3

| Metal complex | M | A1 Bond position on benzene ring | Substituent | A2 Bond position on benzene ring | Substituent | A3 Bond position on benzene ring | Substituent | $B_1$ | $J^+$ | Av. particle diam. (μm) |
|---|---|---|---|---|---|---|---|---|---|---|
| A-1 | Fe | 3 | Cl | 4 | Cl | 4 | Cl | $CH_3$ | H | 2.2 |
| A-2 | Cr | — | H | — | H | 4 | Cl | $CH_3$ | H | 16.8 |

TABLE 3-continued

| Metal complex | M | A1 Bond position on benzene ring | A1 Substituent | A2 Bond position on benzene ring | A2 Substituent | A3 Bond position on benzene ring | A3 Substituent | B1 | J+ | Av. particle diam. (μm) |
|---|---|---|---|---|---|---|---|---|---|---|
| A-3 | Fe | | | Entered in formula (5) | | | | | NH4, Na, H | 2.5 |
| A-4 | Cr | | | Entered in formula (6) | | | | | H | 20.5 |
| A-5 | Al | — | H | — | H | 4 | Cl | CH3 | H | 19.5 |
| A-6 | Fe | 3 | NO2 | 4 | NO2 | 4 | Cl | CH3 | H | 8.3 |
| A-7 | Fe | 3 | Cl | 4 | Cl | 4 | Cl | CH3 | NH4, Na, H | 12.5 |
| A-8 | Cr | | | Entered in formula (7) | | | | | Na | 4.5 |
| a-1 | | | | Diammonium iridium hexachloride | | | | | | 10.5 |

Conductive Particles:

As the conductive particles used in the surface layer of the developer carrying member, the following conductive particles 1 and 2 were used.

Conductive Particles 1

Graphite particles (HOP, trade name; available from Nippon Graphite Industries, Ltd.; volume average particle diameter: 4.0 μm) were used as conductive particles 1.

Conductive Particles 2

Carbon black (trade name: TOKA BLACK #5500; available from Tokai Carbon Co., Ltd.) was used as conductive particles 2.

Binder Resin:

As the binder resin used in the surface layer of the developer carrying member, the following resins B-1 to B-3, b-1 and b-2 were used.

Binder Resin B-1

Resol type phenol resin (trade name: J-325CA; available from DIC Corporation) making use of an ammonia catalyst was used as a resin B-1.

Binder Resin B-2

A mixture of polyol (trade name: NIPPOLAN 5037; available from Nippon Polyurethane Industry Co., Ltd.) and a curing agent (trade name: COLONATE L, trade name; available from Nippon Polyurethane Industry Co., Ltd.) in a mass ratio of 10:1 was used as a resin B-2.

Binder Resin B-3

A 6/66/610 copolymer nylon (trade name: ELVAMIDE 8023; available from Du Pont Japan Ltd.) was used as a resin B-3.

Binder Resin b-1

Resol type phenol resin GF9000 (trade name; available from Dainippon Ink & Chemicals, Incorporated) making use of an NaOH catalyst was used as a resin b-1.

Binder Resin b-2

Silicone resin SH804 (trade name; available from Dow Corning Toray Silicone Co., Ltd.) was used as a resin b-2.

Quaternary Ammonium Salt:

As the quaternary ammonium salt used in the surface layer of the developer carrying member, the following quaternary ammonium salts C-1 to C-3 were used.

Quaternary Ammonium Salt C-1

As a quaternary ammonium salt C-1, a quaternary ammonium salt (trade name: BONTRON P-51; available from Orient Chemical Industries, Ltd.), the compound of Exemplary No. 1 in Table 1, was used.

Quaternary Ammonium Salt C-2

As a quaternary ammonium salt C-2, a quaternary ammonium salt (trade name: TP-415; available from Hodogaya Chemical Co., Ltd.), the compound of Exemplary No. 16 in Table 2, was used.

Quaternary Ammonium Salt C-3

As a quaternary ammonium salt C-3, a quaternary ammonium salt represented by the following formula (8) (trade name: ARQUAD 22-80; available from Lion Akzo Co., Ltd.) was used.

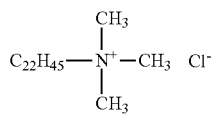

Formula (8)

Unevenness-Providing Particles:

As the unevenness-providing particles used in the surface layer of the developer carrying member, spherical carbon particles (trade name: NICABEADS ICB0520; available from Nippon Carbon Co., Ltd.) were used.

Developer:

As the developer used in evaluation, the following was used.

Developer Z-1

TABLE 4

| Polyester monomers | mol % |
|---|---|
| Propoxidized bisphenol A (2.2 mole addition product) | 25.0 |
| Ethoxidized bisphenol A (2.2 mole addition product) | 25.0 |
| Terephthalic acid | 33.0 |
| Trimellitic anhydride | 5 |
| Adipic acid | 6.5 |
| Acrylic acid | 3.5 |
| Fumaric acid | 2.0 |

Polyester monomers shown in Table 4 above were fed into a four-necked flask together with an esterifying catalyst (dibutyltin oxide), and a vacuum device, a water separator, a nitrogen gas feeder, a temperature measuring device and a stirrer were attached to the flask, followed by stirring at 135° C. in an atmosphere of nitrogen. In this occasion, in order to obtain the desired cross-linked structure, fumaric acid was dividedly added at the initial stage and latter stage of the reaction. To the mixture obtained, what was obtained by mixing vinyl type copolymerization monomers (styrene: 84 mol % and 2-ethylhexyl acrylate: 14 mol %) and as a polymerization initiator 2 mol % of benzoyl peroxide was dropwise added from a dropping funnel over a period of 4 hours. Thereafter, reaction was carried out at 135° C. for 5 hours, and then the reaction temperature at the time of polycondensation was raised to 230° C. to carry out polycondensation reaction. After the reaction was completed, the reaction product was taken out of the flask, followed by cooling and then pulverization to obtain a binder resin E-1. This binder resin E-1 had a Tg of 54.5° C. and a softening point of 135.5° C.

TABLE 5

| Polyester monomers | mol % |
|---|---|
| Terephthalic acid | 31 |
| Trimellitic anhydride | 7 |
| Propoxidized bisphenol A (2.2 mole addition product) | 35 |
| Ethoxidized bisphenol A (2.2 mole addition product) | 27 |

Polyester monomers shown in Table 5 above were fed into a four-necked flask together with an esterifying catalyst (dibutyltin oxide), and a vacuum device, a water separator, a nitrogen gas feeder, a temperature measuring device and a stirrer were attached to the flask, followed by stirring at 135° C. in an atmosphere of nitrogen. To the mixture obtained, what was obtained by mixing vinyl type copolymerization monomers (styrene: 84 mol % and 2-ethylhexyl acrylate: 14 mol %) and as a polymerization initiator 2 mol % of benzoyl peroxide was dropwise added from a dropping funnel over a period of 4 hours. Thereafter, reaction was carried out at 135° C. for 5 hours, and then the reaction temperature at the time of polycondensation was raised to 230° C. to carry out polycondensation reaction. After the reaction was completed, the reaction product was taken out of the flask, followed by cooling and then pulverization to obtain a binder resin E-2. This binder resin E-2 had a Tg of 56.8° C. and a softening point of 99.0° C.

Next, 85 parts by mass of the binder resin E-1 and 15 parts by mass of the binder resin E-2 were mixed by means of Henschel mixer to make up a binder resin F-1.

TABLE 6

| Materials | Parts by mass |
|---|---|
| Above binder resin F-1 | 100 |
| Magnetic iron oxide particles (average particle diameter: 0.15 μm; Hc: 11.5 kA/m, σs: 88 Am²/kg; σr of 14 Am²/kg | 55 |
| Fischer-Tropsch wax (Mn: 1,500; Mw: 2,500; melting point: 105° C.) | 4 |

Subsequently, materials shown in Table 6 above were premixed by means of Henschel mixer, and thereafter the mixture obtained was melt-kneaded by means of a twin-screw kneading extruder. At this point, retention time was so controlled that the resin kneaded had a temperature of 150° C.

The kneaded product obtained was cooled and thereafter crushed by means of a hammer mill, followed by grinding. A grinding machine used therefor was TURBO MILL (trade name; manufactured by Turbo Kogyo Co., Ltd.), the surfaces of a rotator and a stator of which were coated by plating of a chromium alloy containing chromium carbide, in a plating thickness of 150 μm and a surface hardness of HV 1,050. The finely pulverized product thus obtained was classified by means of a multi-division classifier utilizing the Coanda effect (trade name: Elbow Jet Classifier, manufactured by Nittetsu Mining Co., Ltd.) to obtain a negatively triboelectrically chargeable magnetic developer particles.

To 100 parts by mass of the magnetic developer particles thus obtained, 1.0 part by mass of hydrophobic fine silica powder (BET specific surface area: 140 m²/g and 3.0 parts by mass of strontium titanate powder were externally added, followed by sieving with a sieve of 150 μm in mesh opening to obtain a negatively triboelectrically chargeable magnetic developer Z-1 having a weight average particle diameter of 5.9 μm and an average circularity of 0.949.

Developer Z-2

Materials shown in Table 7 below were introduced into a pressurizable reaction vessel having a reflux tube, a stirrer, a thermometer, a nitrogen feed tube, a dropping unit and an evacuation unit, and then heated to reflux temperature with stirring.

TABLE 7

| | Materials | Parts by mass |
|---|---|---|
| Solvents | Methanol | 250 |
| | 2-Butanone | 150 |
| | 2-Propanol | 100 |
| Monomers | Styrene | 82 |
| | Butyl acrylate | 13 |
| | 2-Acrylamido-2-methylpropanesulfonic acid | 4 |

Subsequently, to the liquid mixture obtained, a solution prepared by diluting 0.45 part by mass of a polymerization initiator t-butyl peroxy-2-ethylhexanoate with 20 parts by mass of 2-butanone was dropwise added over a period of 30 minutes, and the stirring was continued for 5 hours, to which a solution prepared by diluting 0.28 part by mass of t-butyl peroxy-2-ethylhexanoate with 20 parts by mass of 2-butanone was further dropwise added over a period of 30 minutes, followed by stirring for further 5 hours to carry out polymerization. Thereafter, the reaction solution obtained was poured into methanol to effect precipitation of a sulfonic acid group-containing polymer S. The polymer obtained had a glass transition temperature (Tg) of 70.2° C. and weight-average molecular weight of 22,000.

Next, materials shown in Table 8 below were uniformly dispersed and mixed by means of Attritor (trade name; manufactured by Mitsui Miike Engineering Corporation) to obtain a monomer composition.

TABLE 8

| Materials | Parts by mass |
|---|---|
| Styrene | 78 |
| n-Butyl acrylate | 22 |
| Divinylbenzene | 0.5 |
| Polyester resin (saturated polyester resin obtained by condensation reaction of terephthalic acid with ethylene oxide addition product of bisphenol A; Mn: 5,000; acid value: 10 mgKOH/g; Tg: 68° C. | 10 |
| Above sulfonic acid group-containing polymer S | 2 |
| Spherical magnetic material particles (average particle diameter: 0.2 μm; saturation magnetization σs: 67.3 Am²/kg (emu/g); residual magnetization σr: 4.0 Am²/kg (emu/g) | 80 |

The monomer composition thus obtained was heated to 60° C., and 7 parts by mass of an ester wax (maximum value of endothermic peak in DSC: 72° C.) was added thereto and mixed to dissolve it therein. To the mixture obtained, 3 parts by mass of a polymerization initiator 2,2'-azobis(2,4-dimethylvaleronitrile) was dissolved to obtain a polymerizable monomer composition A.

Meanwhile, in 709 parts by mass of ion-exchanged water, 451 parts by mass of an aqueous 0.1-M $Na_3PO_4$ solution was introduced, followed by heating to 60° C. Thereafter, to the resultant mixture, 67.7 parts by mass of an aqueous 1.0-M $CaCl_2$ solution was added to obtain an aqueous medium A containing $Ca_3(PO_4)_2$.

Into this aqueous medium A, the above polymerizable monomer composition A was introduced, followed by stirring for 15 minutes at 60° C. in an atmosphere of $N_2$, using TK type homomixer (manufactured by Tokushu Kika Kogyo Co., Ltd.) at 12,000 rpm to carry out granulation. Thereafter, the granulated product obtained was stirred with a paddle stirring blade, during which the reaction was carried out at 70° C. for 5 hours. Thereafter, this was further continued to be stirred for 4 hours while maintaining the liquid temperature at 80° C. After the reaction was completed, distillation was carried out at 80° C. for further 2 hours, thereafter the suspension formed was cooled, and then hydrochloric acid was added thereto to dissolve the dispersant, followed by filtration, washing with water and then drying to obtain black particles having a weight average particle diameter of 6.5 μm.

100 parts by mass of the black particles thus obtained and 1.2 parts by mass of hydrophobic fine silica powder obtained by treating silica of 12 nm in primary particle diameter with hexamethyldisilazane and thereafter with silicone oil and having a BET specific surface area of 120 $m^2/g$ after the treatment were blended by means of Henschel mixer (manufactured by Mitsui Miike Engineering Corporation). As the result, it was able to produce a negatively triboelectrically chargeable magnetic developer Z-2 having a weight average particle diameter of 6.3 μm and an average circularity of 0.989.

Developer Z-3

A polymerization developer was prepared according to the following procedure.

To 900 parts by mass of ion-exchanged water heated to 60° C., 3 parts by mass of tricalcium phosphate was added, followed by stirring at 10,000 rpm by means of a stirrer (trade name: TK-type homomixer; manufactured by PRIMIX Corporation) to prepare an aqueous medium B.

Materials shown in Table 9 below were also introduced into a homogenizer, and then heated to 60° C., followed by stirring at 8,000 rpm by means of the TK-type homomixer to effect dispersion.

TABLE 9

| Materials | Parts by mass |
|---|---|
| Styrene | 130 |
| n-Butyl acrylate | 60 |
| C.I. Pigment Blue 15: 3 | 18 |
| Salicylic acid aluminum compound (trade name: BONTRON E-88, available from Orient Chemical Industries, Ltd.) | 2 |
| Polyester resin (polycondensation product of propylene oxide modified bisphenol A and isophthalic acid; Tg: 65° C.; Mw: 10,000; Mn: 6,000) | 15 |
| Stearyl stearate wax (DSC main peak: 60° C.) | 40 |
| Divinylbenzene | 0.5 |

In this, 5 parts by mass of a polymerization initiator 2,2'-azobis(2,4-dimethylvaleronitrile) was dissolved to prepare a polymerizable monomer composition B.

The polymerizable monomer composition B was introduced into the above aqueous medium B, followed by stirring at 8,000 rpm at a temperature of 60° C. in an atmosphere of nitrogen, using the TK-type homomixer, to granulate the polymerizable monomer composition.

Thereafter, the granulated product obtained was moved to a reaction vessel having a propeller stirrer and stirred, during which the temperature was raised to 70° C. over a period of 2 hours. Four hours after, the temperature was further raised to 80° C. at a rate of heating of 40° C./hr, where the reaction was carried out at 80° C. for hours to produce polymer particles. After the polymerization was completed, a slurry containing the polymer particles was cooled, which was then washed with water used in an amount 10 times that of the slurry, followed by filtration, drying, and thereafter classification to control particle diameter to obtain base particles of a cyan developer.

Subsequently, materials shown in Table 10 below were blended by dry processing for 5 minutes by means of Henschel mixer to obtain a negatively triboelectrically chargeable non-magnetic one-component developer (developer Z-3) having a weight average particle diameter of 5.7 μm and an average circularity of 0.987.

TABLE 10

| Materials | Parts by mass |
|---|---|
| Above base particles | 100 |
| Hydrophobic fine silica powder surface-treated with hexamethyldisilazane (average primary particle diameter: 7 nm) | 1.0 |
| Rutile-type fine titanium oxide powder (average primary particle diameter: 45 nm) | 0.18 |
| Rutile-type fine titanium oxide powder (average primary particle diameter: 200 nm) | 0.5 |

Example 1

To a mixture of materials shown in Table 11 below, methanol was added to control the mixture to have a solid content of 40% by mass, and this was dispersed for 2 hours by means of a sand mill (trade name: SAND GRINDER LSG-4U-08; manufactured by IMEX Co., Ltd.; making use of glass beads of 1 mm in diameter). Subsequently, the glass beads were separated by using a sieve, and thereafter methanol was so added as to control the product to have a solid matter concentration of 33% by mass, to obtain a coating material.

TABLE 11

| Materials | Parts by mass |
|---|---|
| Above resin B-1 | 167 (solid content: 100 parts by mass) |
| Above conductive particles 1 | 30 |
| Above conductive particles 2 | 5 |
| Above quaternary ammonium salt C-1 | 5 |
| Above complex A-1 | 20 |
| Above unevenness-providing particles | 30 |

Next, as a substrate, a cylindrical tube made of aluminum and having been worked by grinding to have an outer diameter of 24.5 mm and an arithmetic-mean roughness Ra of 0.2 μm was prepared, which was masked at its upper and lower end portions (both end portions of the substrate in its axial direction). This substrate was kept to stand upright and rotated at a stated speed, and was coated thereon with the above coating material while a spray gun was descended at a stated speed. Here, as coating conditions, the coating was carried out in an environment of temperature 30° C./humidity 35% RH RH and in the state that the temperature of the coating material was controlled to a temperature of 28° C. in a thermostatic chamber. Subsequently, the coat layer formed was cured and dried by heating it at a temperature of 150° C. for 30 minutes in a hot-air drying furnace, to produce a developer carrying member T1.

The surface layer of the developer carrying member T1 was 11 μm in layer thickness and 0.85 μm in surface roughness Ra. The materials added and physical properties of the surface layer of the developer carrying member T1 are shown in Table 12. Incidentally, in Tables 12, 15 and 17, "pbm" refers to parts by mass and "pbm" of resin refers to parts by mass of resin solid content.

In the evaluation of the developer carrying member, an electrophotographic image forming apparatus (trade name: IR-ADVANCE 6075; manufactured by CANON INC.) was used the photosensitive drum of which is an amorphous silicon drum photosensitive member. This electrophotographic image forming apparatus is one having the non-contact developing assembly making use of a magnetic one-component developer, shown in FIG. 1. That is, this developing assembly has the magnetic one-component developer and also has the magnetic blade as a developer layer thickness regulating member. Also, in the interior of the developer carrying member T1 according to this Example, the magnet was provided as shown in FIG. 1.

The developer carrying member T1 was set in the developing assembly, the sleeve-to-drum distance was set to be 240 μm, and the developer Z-1 was used. Copying environments were a high temperature and high humidity environment (H/H) of temperature 30° C. and humidity 80% RH, a normal temperature and normal humidity environment (N/N) of temperature 23° C. and humidity 50% RH and a normal temperature and low humidity environment (N/L) of temperature 23° C. and humidity 5% RH, where, using a test chart having a print percentage of 1.5%, images were continuously reproduced on 1,000,000 sheets (running test) in each environment. Here, the following evaluations were made when copied on 10th sheet (initial stage) and when copied on 1,000,000th sheet (after running).

Results obtained from the following evaluations (1) to (5) are shown in Table 13. Incidentally, a schematic view of this developing assembly is what is shown as FIG. 1.

Evaluations (1) Image Density:

Copied-image densities of solid black circular areas of 5 mm in diameter on the copies obtained by image reproduction of the test chart having a print percentage of 5.5% were measured as reflection densities by using a reflection densitometer (trade name: RD918; manufactured by Gretag Macbeth Ag.), and an average value thereof at arbitrary 10 spots was taken as each image density. Besides the evaluation at the initial stage and after the running in each environment of H/H, N/N and N/L, an image density measured after the evaluation machine was left to stand for 10 days in the H/H environment after the finish of the running (continuous copying on 1,000,000 sheets) was also evaluated on images reproduced in the same way as the above. On that occasion, the percent (%) of a decrease in density between images before and after the running was also noted. Where the density increased as a result of the running, it was shown as a negative value.

(2) Sleeve Ghost:

As images to be reproduced by the image forming apparatus, a chart was used in which a zone located at the image sheet leading end and corresponding to one round of the developer carrying member was provided in its white background with hieroglyphic images composed of solid black squares and circles arranged at equal intervals and the other part was provided with halftone images. Based on how a ghost(s) of the hieroglyphic images appeared on the halftone images, the results were ranked according to the following criteria. Here, the images were reproduced after an image where no image was formed and no developer was consumed was reproduced on 3 sheets immediately before they were reproduced.

A: Any difference in tone is not seen at all.

B: A slight difference in tone is seen.

C: Some difference in tone is seen, but the hieroglyphic images are not clearly recognizable in shape.

D: A difference in tone appears for sleeve one round.

E: A difference in tone appears for sleeve two or more rounds.

(3) Blotches:

In making image evaluation for each developer carrying member, the surface of the developer carrying member surface layer was observed to visually observe whether or not any spotty images or wave-pattern images (blotches) were present which were caused by faulty triboelectric charge-providing to the developer. A case in which the blotches were present was marked with "NG" in the column of evaluation results of the table, and a case in which no blotches were present was marked with "OK". Where the blotches were present, they appeared also on images to make any accurate evaluation unable, and hence the other evaluations were stopped. Here, the evaluation was made in the normal temperature and low humidity environment (N/L) of temperature 23° C. and humidity 5% RH.

(4) Wear Resistance of Surface Layer:

The outer diameter of the developer carrying member was measured, and the values before service were subtracted from the values after running. The values found were taken as wear depths of the surface layer, and an average value thereof was taken as the wear depth of the whole surface layer. Incidentally, in measuring the values after running, the surface of the developer carrying member was cleaned with isopropanol. Here, in measuring the values after running, a developer carrying member having been put to the running in the normal temperature and normal humidity environment (N/N) of temperature 23° C. and humidity 50% RH was used.

(5) Surface Roughness Ra of Surface Layer:

The arithmetic-mean roughness Ra of the surface of the developer carrying member was measured before and after the running. Here, in the measurement after the running, a developer carrying member having been put to the running in the normal temperature and normal humidity environment (N/N) of temperature 23° C. and humidity 50% RH was used.

Examples 2 to 16 & Comparative Examples 1 to 6

Developer carrying members T2 to T16 and H1 to H6 were produced in the same way as Example 1 except that the constitution of each developer carrying member was changed as shown in Table 12. Note that, in Example 6, the solid content of the coating material used to form the surface layer was 15% by mass. For the developer carrying members T2 to T16 and H1 to H6 each, the developer Z-1 was used and the images formed were evaluated in the same way as Example 1. Evaluation results obtained are shown in Tables 13 and 14.

TABLE 12

Developer Carrying Member Production Examples

| Developer carrying member | Surface layer | | | | | | | | | PR |
|---|---|---|---|---|---|---|---|---|---|---|
| | Materials added | | | | | | | | | |
| | Conductive particles | | Resin | | Quaternary ammonium salt | | Complex | | UPP | LT |
| | 1 pbm | 2 pbm | Type | pbm | Type | pbm | Type | pbm | pbm | μm |
| Example: | | | | | | | | | | |
| 1 | T1 | 30 | 5 | B-1 | 100 | C-1 | 5 | A-1 | 20 | 30 | 11 |
| 2 | T2 | 30 | 5 | B-1 | 100 | C-1 | 5 | A-2 | 20 | 30 | 11 |
| 3 | T3 | 30 | 5 | B-1 | 100 | C-1 | 5 | A-3 | 20 | 30 | 11 |
| 4 | T4 | 30 | 5 | B-1 | 100 | C-1 | 5 | A-4 | 20 | 30 | 11 |
| 5 | T5 | 30 | 5 | B-2 | 100 | C-1 | 5 | A-1 | 20 | 30 | 11 |
| 6 | T6 | 30 | 5 | B-3 | 100 | C-1 | 5 | A-1 | 20 | 30 | 11 |
| 7 | T7 | 30 | 5 | B-1 | 100 | C-2 | 5 | A-1 | 20 | 30 | 11 |
| 8 | T8 | 30 | 5 | B-3 | 100 | C-2 | 5 | A-1 | 20 | 30 | 11 |
| 9 | T9 | 30 | 5 | B-1 | 100 | C-1 | 1 | A-1 | 1 | 30 | 11 |
| 10 | T10 | 30 | 5 | B-1 | 100 | C-1 | 20 | A-1 | 1 | 30 | 11 |
| 11 | T11 | 30 | 5 | B-1 | 100 | C-1 | 1 | A-1 | 40 | 30 | 11 |
| 12 | T12 | 30 | 5 | B-1 | 100 | C-1 | 20 | A-1 | 40 | 30 | 11 |
| 13 | T13 | 30 | 5 | B-1 | 100 | C-1 | 5 | A-5 | 20 | 30 | 11 |
| 14 | T14 | 30 | 5 | B-1 | 100 | C-1 | 5 | A-6 | 20 | 30 | 11 |
| 15 | T15 | 30 | 5 | B-1 | 100 | C-1 | 5 | A-7 | 20 | 30 | 11 |
| 16 | T16 | 30 | 5 | B-1 | 100 | C-3 | 5 | A-1 | 20 | 30 | 11 |
| Comparative Example: | | | | | | | | | | |
| 1 | H1 | 30 | 5 | b-1 | 100 | C-1 | 5 | A-1 | 20 | 30 | 11 |
| 2 | H2 | 30 | 5 | b-2 | 100 | C-1 | 5 | A-1 | 20 | 30 | 11 |
| 3 | H3 | 30 | 5 | B-1 | 100 | C-1 | 5 | a-1 | 20 | 30 | 11 |
| 4 | H4 | 30 | 5 | B-1 | 100 | C-1 | 25 | — | — | 30 | 11 |
| 5 | H5 | 30 | 5 | B-1 | 100 | — | — | A-1 | 25 | 30 | 11 |
| 6 | H6 | 30 | 5 | B-1 | 100 | C-1 | 70 | — | — | 30 | 11 |

UPP: Unevenness-providing particles
PR: Physical properties; LT: layer thickness

TABLE 13

IR-ADV6075 Evaluation Results 1

| | | Image density | | | | Sleeve ghost | | | Blotches | Wear depth | Ra |
|---|---|---|---|---|---|---|---|---|---|---|---|
| | | N/L | N/N | H/H | H/H 10 days * | N/L | N/N | H/H | N/L | (μm) | (μm) |
| Example: | | | | | | | | | | | |
| 1 | INS | 1.53 | 1.51 | 1.48 | | A | A | A | OK | 0.4 | 0.85 |
| | AFR | 1.52 | 1.51 | 1.48 | 1.47 | A | A | A | OK | | 0.84 |
| | Dc % | 0.7 | 0.0 | 0.0 | 0.7 | | | | | | |
| 2 | INS | 1.52 | 1.49 | 1.47 | | A | A | A | OK | 0.7 | 0.86 |
| | AFR | 1.52 | 1.48 | 1.46 | 1.45 | A | A | A | OK | | 0.83 |
| | Dc % | 0.0 | 0.7 | 0.7 | 1.4 | | | | | | |
| 3 | INS | 1.52 | 1.48 | 1.45 | | A | A | A | OK | 0.7 | 0.87 |
| | AFR | 1.52 | 1.46 | 1.42 | 1.40 | A | A | A | OK | | 0.83 |
| | Dc % | 0.0 | 1.4 | 2.1 | 3.4 | | | | | | |
| 4 | INS | 1.51 | 1.45 | 1.43 | | A | A | A | OK | 1.5 | 0.86 |
| | AFR | 1.50 | 1.44 | 1.40 | 1.38 | A | A | A | OK | | 0.79 |
| | Dc % | 0.7 | 0.7 | 2.1 | 3.5 | | | | | | |
| 5 | INS | 1.44 | 1.44 | 1.42 | | A | A | A | OK | 2.6 | 0.88 |
| | AFR | 1.42 | 1.41 | 1.39 | 1.37 | B | A | B | OK | | 0.77 |
| | Dc % | 1.4 | 2.1 | 2.1 | 3.5 | | | | | | |
| 6 | INS | 1.46 | 1.46 | 1.44 | | B | A | B | OK | 3.0 | 0.83 |
| | AFR | 1.45 | 1.44 | 1.41 | 1.39 | B | A | B | OK | | 0.71 |
| | Dc % | 0.7 | 1.4 | 2.1 | 3.5 | | | | | | |
| 7 | INS | 1.52 | 1.50 | 1.47 | | A | A | A | OK | 0.6 | 0.85 |
| | AFR | 1.51 | 1.49 | 1.46 | 1.45 | A | A | A | OK | | 0.82 |
| | Dc % | 0.7 | 0.7 | 0.7 | 1.4 | | | | | | |

TABLE 13-continued

IR-ADV6075 Evaluation Results 1

| | | Image density | | | | Sleeve ghost | | | Blotches | Wear depth | Ra |
|---|---|---|---|---|---|---|---|---|---|---|---|
| | | N/L | N/N | H/H | H/H 10 days * | N/L | N/N | H/H | N/L | (µm) | (µm) |
| 8 | INS | 1.46 | 1.47 | 1.45 | | B | A | B | OK | 3.5 | 0.85 |
| | AFR | 1.44 | 1.44 | 1.42 | 1.40 | B | A | B | OK | | 0.71 |
| | Dc % | 1.4 | 2.0 | 2.1 | 3.4 | | | | | | |
| 9 | INS | 1.54 | 1.53 | 1.50 | | B | B | A | OK | 0.2 | 0.91 |
| | AFR | 1.53 | 1.52 | 1.48 | 1.47 | C | A | A | OK | | 0.89 |
| | Dc % | 0.6 | 0.7 | 1.3 | 2.0 | | | | | | |
| 10 | INS | 1.52 | 1.52 | 1.50 | | B | A | A | OK | 1.0 | 0.87 |
| | AFR | 1.51 | 1.51 | 1.49 | 1.47 | B | A | A | OK | | 0.85 |
| | Dc % | 0.7 | 0.7 | 0.7 | 2.0 | | | | | | |
| 11 | INS | 1.50 | 1.48 | 1.46 | | B | A | A | OK | 2.4 | 0.82 |
| | AFR | 1.48 | 1.46 | 1.44 | 1.42 | A | A | A | OK | | 0.74 |
| | Dc % | 1.3 | 1.4 | 1.4 | 2.7 | | | | | | |
| 12 | INS | 1.45 | 1.45 | 1.45 | | A | A | A | OK | 3.5 | 0.80 |
| | AFR | 1.45 | 1.43 | 1.43 | 1.40 | A | A | A | OK | | 0.66 |
| | Dc % | 0.0 | 1.4 | 1.4 | 3.4 | | | | | | |
| 13 | INS | 1.52 | 1.50 | 1.47 | | A | A | A | OK | 2.0 | 0.86 |
| | AFR | 1.52 | 1.49 | 1.45 | 1.41 | A | A | B | OK | | 0.80 |
| | Dc % | 0.0 | 0.7 | 1.4 | 4.1 | | | | | | |
| 14 | INS | 1.52 | 1.51 | 1.50 | | A | A | A | OK | 0.6 | 0.85 |
| | AFR | 1.52 | 1.49 | 1.47 | 1.43 | A | A | A | OK | | 0.83 |
| | Dc % | 0.0 | 1.3 | 2.0 | 4.7 | | | | | | |
| 15 | INS | 1.52 | 1.52 | 1.51 | | A | A | A | OK | 0.5 | 0.86 |
| | AFR | 1.51 | 1.51 | 1.50 | 1.48 | A | A | A | OK | | 0.85 |
| | Dc % | 0.7 | 0.7 | 0.7 | 2.0 | | | | | | |
| 16 | INS | 1.54 | 1.53 | 1.52 | | B | A | A | OK | 0.7 | 0.86 |
| | AFR | 1.52 | 1.52 | 1.49 | 1.46 | B | A | A | OK | | 0.83 |
| | Dc % | 1.3 | 0.7 | 2.0 | 3.9 | | | | | | |

* After leaving for 10 days in H/H
INS: Initial stage; AFR: After running; Dc %: percent of decrease in density

TABLE 14

IR-ADV6075 Evaluation Results 2

| | | Image density | | | | Sleeve ghost | | | Blotches | Wear depth | Ra |
|---|---|---|---|---|---|---|---|---|---|---|---|
| | | N/L | N/N | H/H | H/H 10 days * | N/L | N/N | H/H | N/L | (µm) | (µm) |
| Comparative Example: | | | | | | | | | | | |
| 1 | INS | — | 1.54 | 1.52 | | — | C | D | NG | 0.5 | 0.85 |
| | AFR | — | 1.52 | 1.50 | 1.43 | — | D | E | — | | 0.81 |
| | Dc % | — | 1.3 | 1.3 | 5.9 | | | | | | |
| 2 | INS | — | 1.48 | 1.45 | | — | D | E | NG | 1.3 | 0.91 |
| | AFR | — | 1.46 | 1.44 | 1.37 | — | E | E | — | | 0.84 |
| | Dc % | — | 1.4 | 0.7 | 5.5 | | | | | | |
| 3 | INS | 1.57 | 1.53 | 1.48 | | D | C | D | OK | 1.6 | 0.85 |
| | AFR | 1.55 | 1.52 | 1.42 | 1.40 | E | D | E | OK | | 0.78 |
| | Dc % | 1.3 | 0.7 | 4.1 | 5.4 | | | | | | |
| 4 | INS | 1.55 | 1.50 | 1.47 | | B | A | B | OK | 1.0 | 0.89 |
| | AFR | 1.53 | 1.49 | 1.43 | 1.41 | D | D | B | OK | | 0.85 |
| | Dc % | 1.3 | 0.7 | 2.7 | 4.1 | | | | | | |
| 5 | INS | — | 1.55 | 1.52 | | — | B | C | NG | 1.6 | 0.89 |
| | AFR | — | 1.53 | 1.50 | 1.40 | — | D | D | — | | 0.85 |
| | Dc % | — | 1.3 | 1.3 | 7.9 | | | | | | |
| 6 | INS | 1.55 | 1.50 | 1.46 | | A | A | A | OK | 7.1 | 0.86 |
| | AFR | 1.53 | 1.35 | 1.25 | 1.18 | C | B | C | OK | | 0.59 |
| | Dc % | 1.3 | 10.0 | 14.4 | 19.2 | | | | | | |

* After leaving for 10 days in H/H
INS: Initial stage; AFR: After running; Dc %: percent of decrease in density How the developer carrying member according to the present invention is remarkably effective can be understood from the results shown in Table 13. That is, in each Example, the production of the developer carrying member having the surface layer containing the specific azo metal complex compound, the quaternary ammonium salt, the resin with specific structure and the conductive particles has enabled the developer to maintain a stable triboelectric charge quantity without being triboelectrically charged in excess. Hence, this has made good evaluation results obtainable in running service. In particular, good evaluation results were obtainable when the azo metal complex compound represented by the formula (2) was used.

On the other hand, in Comparative Examples 1 and 2, the resin used in the developer carrying member had none of structures with the —$NH_2$ group, the =NH group and the —NH-linkage, and hence the blotches occurred which were considered due to excess triboelectric charging of the developer. The ghost also occurred very much.

Comparative Example 3 is an example in which a complex compound different from the azo metal complex compound represented by the formula (1) was used, and Comparative Example 4 is an example in which the azo metal complex compound represented by the formula (1) and any of the other complex compounds were not used. In the both, the specific resin and the quaternary ammonium salt, used in the present invention, were used and hence the blotches were not seen to have occurred, but the azo metal complex compound represented by the formula (1) was not used and hence the ghost occurred very much.

In Comparative Example 5, any quaternary ammonium salt was not added, and hence the blotches were seen to have occurred and further the ghost occurred very much. In Comparative Example 6, the quaternary ammonium salt was added in an amount larger than that in Comparative Example 4, and hence the level of the ghost was lower than that in Comparative Example 4. However, its addition in a larger amount brought a large wear depth and a low Ra during the running, resulting in a low running image density.

Example 17

A coating material composed as shown in Table 15 and having a solid matter concentration of 33% by mass like Example 1 was used and, as a substrate, a cylindrical tube made of aluminum and having been worked by grinding to have an outer diameter of 14.0 mm and an arithmetic-mean roughness Ra of 0.2 μm was prepared, which was masked at its upper and lower end portions. This substrate was kept to stand upright and rotated at a stated speed, and was coated thereon with the coating material while a spray gun was descended at a stated speed. Here, as coating conditions, the coating was carried out in an environment of temperature 30° C./humidity 35% RH RH and in the state that the temperature of the coating material was controlled to a temperature of 28° C. in a thermostatic chamber. Subsequently, the coat layer formed was cured and dried by heating it at a temperature of 150° C. for 30 minutes in a hot-air drying furnace, to produce a developer carrying member T17.

The surface layer of the developer carrying member T7 was 7 μm in layer thickness and 0.99 μm in Ra. The materials added and physical properties of the surface layer of the developer carrying member T17 are shown in Table 15.

In the evaluation of the developer carrying member, a laser printer (trade name: LASER JET P2055dn; manufactured by Hewlett-Packard Co.) was used. This laser printer is an electrophotographic image forming apparatus having the magnetic one-component non-contact developing assembly shown in FIG. 2. That is, this developing assembly has the magnetic one-component developer and also has the elastic blade as a developer layer thickness regulating member. Also, in the interior of the developer carrying member T24 according to this Example, the magnet was provided as shown in FIG. 2.

This developer carrying member T17 was set in a process cartridge, and also the developer Z-2 was filled therein. This process cartridge was mounted to the above laser printer, and image evaluation was made. In the evaluation, using a character pattern having a print percentage of 1.0%, images were reproduced in an intermittent mode of 2 sheets/7 seconds on 10,000 sheets (running test). Images for evaluation were reproduced when printed on 100th sheet (initial stage) in the course of printing and when printed on 10,000th sheet (after running). The same evaluations as Example 1 were made, but as evaluation environments in a low temperature and low humidity environment (L/L) of 15° C. and 10% RH, a normal temperature and normal humidity environment (N/N) of 23° C. and 50% RH and a high temperature and high humidity environment (H/H) of 32° C. and 85% RH. Here, the evaluation on blotches was made in the low temperature and low humidity environment (L/L) of 15° C. and 10% RH. Evaluation results obtained are shown in Table 16. A schematic view of this developing assembly is what is shown as FIG. 2.

Examples 18 to 22 & Comparative Examples 7 and 8

Developer carrying members T18 to T22 and H7 and H8 were produced in the same way as Example 17 except that the constitution of each developer carrying member was changed as shown in Table 15. The images formed were evaluated in the same way as Example 17. Evaluation results obtained are shown in Table 16.

TABLE 15

Developer Carrying Member Production Examples

| Developer carrying member | Surface layer | | | | | | | | | |
|---|---|---|---|---|---|---|---|---|---|---|
| | Materials added | | | | | | | | PR | |
| | Conductive particles | | Resin | | Quaternary ammonium salt | | Complex | | UPP | LT |
| | 1 pbm | 2 pbm | Type | pbm | Type | pbm | Type | pbm | pbm | μm |
| Example: | | | | | | | | | | |
| 17 | T17 | 50 | 10 | B-1 | 100 | C-1 | 5 | A-1 | 15 | 20 | 7 |
| 18 | T18 | 50 | 10 | B-1 | 100 | C-1 | 5 | A-3 | 15 | 20 | 7 |
| 19 | T19 | 50 | 10 | B-1 | 100 | C-1 | 5 | A-4 | 15 | 20 | 7 |
| 20 | T20 | 50 | 10 | B-2 | 100 | C-1 | 5 | A-1 | 15 | 20 | 7 |
| 21 | T21 | 50 | 10 | B-1 | 100 | C-2 | 5 | A-1 | 15 | 20 | 7 |
| 22 | T22 | 50 | 10 | B-1 | 100 | C-1 | 5 | A-7 | 15 | 20 | 7 |
| Comparative Example: | | | | | | | | | | |
| 7 | H7 | 50 | 10 | b-1 | 100 | C-1 | 5 | A-1 | 15 | 20 | 7 |
| 8 | H8 | 50 | 10 | B-1 | 100 | — | — | A-1 | 20 | 20 | 7 |

UPP: Unevenness-providing particles
PR: Physical properties; LT: layer thickness

TABLE 16

LASER JET P2055dn Evaluation Results

| | | Image density | | | | Sleeve ghost | | | Blotches | Wear depth | Ra |
|---|---|---|---|---|---|---|---|---|---|---|---|
| | | L/L | N/N | H/H | H/H 10 days * | L/L | N/N | H/H | L/L | (μm) | (μm) |
| Example: | | | | | | | | | | | |
| 17 | INS | 1.51 | 1.49 | 1.49 | | A | A | A | OK | 0.5 | 0.99 |
| | AFR | 1.51 | 1.48 | 1.47 | 1.46 | A | A | A | OK | | 0.96 |
| | Dc % | 0.0 | 0.7 | 1.3 | 2.0 | | | | | | |
| 18 | INS | 1.49 | 1.47 | 1.46 | | A | A | A | OK | 0.6 | 0.98 |
| | AFR | 1.48 | 1.47 | 1.44 | 1.43 | A | A | A | OK | | 0.95 |
| | Dc % | 0.7 | 0.0 | 1.4 | 2.1 | | | | | | |
| 19 | INS | 1.49 | 1.47 | 1.46 | | A | A | A | OK | 0.8 | 0.99 |
| | AFR | 1.48 | 1.47 | 1.44 | 1.41 | A | A | A | OK | | 0.95 |
| | Dc % | 0.7 | 0.0 | 1.4 | 3.4 | | | | | | |
| 20 | INS | 1.47 | 1.45 | 1.45 | | A | A | A | OK | 1.8 | 1.02 |
| | AFR | 1.46 | 1.44 | 1.41 | 1.39 | A | A | A | OK | | 0.91 |
| | Dc % | 0.7 | 0.7 | 2.8 | 4.1 | | | | | | |
| 21 | INS | 1.51 | 1.50 | 1.49 | | A | A | A | OK | 0.7 | 1.00 |
| | AFR | 1.50 | 1.50 | 1.47 | 1.45 | A | A | A | OK | | 0.96 |
| | Dc % | 0.7 | 0.0 | 1.3 | 2.7 | | | | | | |
| 22 | INS | 1.52 | 1.49 | 1.47 | | A | A | A | OK | 0.5 | 0.97 |
| | AFR | 1.51 | 1.47 | 1.43 | 1.37 | A | A | A | OK | | 0.94 |
| | Dc % | 0.7 | 1.3 | 2.7 | 6.8 | | | | | | |
| Comparative Example: | | | | | | | | | | | |
| 7 | INS | — | 1.54 | 1.53 | | — | C | D | NG | 0.8 | 1.00 |
| | AFR | — | 1.55 | 1.45 | 1.41 | — | C | E | — | | 0.94 |
| | Dc % | — | −0.6 | 5.2 | 7.8 | | | | | | |
| 8 | INS | — | 1.50 | 1.48 | | — | B | C | NG | 0.7 | 0.97 |
| | AFR | — | 1.49 | 1.41 | 1.39 | — | B | D | — | | 0.96 |
| | Dc % | — | 0.7 | 4.7 | 6.1 | | | | | | |

* After leaving for 10 days in H/H
INS: Initial stage; AFR: After running; Dc %: percent of decrease in density As is seen from the results shown in Table 16, in each Example, the production of the developer carrying member having the surface layer containing the specific azo metal complex compound, the quaternary ammonium salt, the resin with specific structure and the conductive particles has enabled the developer to maintain a stable triboelectric charge quantity without being triboelectrically charged in excess. Hence, this has made good evaluation results obtainable in running service. In particular, good evaluation results were obtainable when the azo metal complex compound represented by the formula (2) was used.

On the other hand, in Comparative Example 7, the resin used in the developer carrying member had none of structures with the —NH$_2$ group, the =NH group and the —NH-linkage, and hence the blotches occurred which were considered due to excess triboelectric charging of the developer. The ghost also occurred very much. In Comparative Example 8, any quaternary ammonium salt was not added, and hence the blotches were seen to have occurred and further the ghost occurred very much.

Example 23

A coating material composed as shown in Table 17 and having a solid matter concentration of 33% by mass like Example 1 was used and, as a substrate, a cylindrical tube made of aluminum and having been worked by grinding to have an outer diameter of 12.0 mm and an arithmetic-mean roughness Ra of 0.2 μm was prepared, which was masked at its upper and lower end portions. This substrate was kept to stand upright and rotated at a stated speed, and was coated thereon with the coating material while a spray gun was descended at a stated speed. Here, as coating conditions, the coating was carried out in an environment of temperature 30° C./humidity 35% RH RH and in the state that the temperature of the coating material was controlled to a temperature of 28° C. in a thermostatic chamber. Subsequently, the coat layer formed was cured and dried by heating it at a temperature of 150° C. for 30 minutes in a hot-air drying furnace, to produce a developer carrying member T23 the surface layer of which was 7 μm in layer thickness and 0.51 μm in Ra. The materials added and physical properties of the surface layer of the developer carrying member T23 are shown in Table 17.

The developer carrying member T23 obtained was set in a cyan cartridge of a laser printer (trade name: LASER SHOT LBP5000; manufactured by CANON INC.), and the developer Z-3 was filled therein. This cyan cartridge was mounted to the laser printer, where, using a test chart having a print percentage of 1.0%, images were reproduced in an intermittent mode of 1 sheet/10 seconds on 5,000 sheets (running test). Images for evaluation were reproduced when printed on 10th sheet (initial stage) in the course of printing and when printed on 5,000th sheet (after running). The laser printer is one having the non-magnetic one-component non-contact developing assembly making use of a non-magnetic toner, shown in FIG. 3. That is, it has the non-magnetic one-component developer and also has the elastic blade as a developer layer thickness regulating member.

Here, the images for running and the images for evaluation were reproduced in, as running environments, a normal temperature and normal humidity environment (N/N) of temperature 23° C. and humidity 50% RH, a low temperature and low humidity environment (L/L) of temperature 15° C. and humidity 10% RH and a high temperature and high humidity environment (H/H) of temperature 32° C. and humidity 85% RH. Also, as image evaluation, the same image density, wear resistance and surface roughness Ra as the foregoing and the following halftone uniformity were evaluated. Evaluation results obtained are shown in Table 18. Incidentally, a schematic view of this developing assembly is what is shown as FIG. 3.

(6) Halftone (HT) Uniformity:

After solid white images were continuously reproduced on 20 sheets, halftone images were reproduced to make visual observation on whether or not any density non-uniformity (misty tone difference) occurred which tended to occur because of excess triboelectric charging of the developer. Here, this evaluation was made when printed on 10th sheet (initial stage) and when printed on 5,000th sheet (after running). A case in which such misty images were present was marked with "NG" in the column of evaluation results of the table, and a case in which no misty images were present was marked with "OK". Here, the evaluation was made in the low temperature and low humidity environment (L/L) of temperature 15° C. and humidity 10% RH.

Examples 24 to 29 & Comparative Examples 9 and 10

Developer carrying members T24 to T29 and H9 and H10 were produced in the same way as Example 23 except that the constitution of each developer carrying member was changed as shown in Table 17. Note that, in Example 26, the solid content of the surface layer forming coating material was 15% by mass. About the developer carrying members T24 to T29 and H9 and H10 each, the images were evaluated in the same way as Example 23. Evaluation results obtained are shown in Table 18.

TABLE 17

Developer Carrying Member Production Examples

| | Developer carrying member | Conductive particles | | Resin | | Quaternary ammonium salt | | Complex | | UPP pbm | LT μm |
|---|---|---|---|---|---|---|---|---|---|---|---|
| | | 1 pbm | 2 pbm | Type | pbm | Type | pbm | Type | pbm | | |
| Example: | | | | | | | | | | | |
| 23 | T23 | 45 | 15 | B-1 | 100 | C-1 | 5 | A-1 | 30 | 5 | 7 |
| 24 | T24 | 45 | 15 | B-1 | 100 | C-1 | 5 | A-3 | 30 | 5 | 7 |

TABLE 17-continued

Developer Carrying Member Production Examples

| | Developer carrying member | Surface layer | | | | | | | | |
|---|---|---|---|---|---|---|---|---|---|---|
| | | Materials added | | | | | | | PR | |
| | | Conductive particles | | Resin | | Quaternary ammonium salt | | Complex | | UPP | LT |
| | | 1 pbm | 2 pbm | Type | pbm | Type | pbm | Type | pbm | pbm | μm |
| 25 | T25 | 45 | 15 | B-1 | 100 | C-1 | 5 | A-4 | 30 | 5 | 7 |
| 26 | T26 | 45 | 15 | B-3 | 100 | C-1 | 5 | A-1 | 30 | 5 | 7 |
| 27 | T27 | 45 | 15 | B-1 | 100 | C-2 | 5 | A-1 | 30 | 5 | 7 |
| 28 | T28 | 45 | 15 | B-1 | 100 | C-1 | 5 | A-7 | 30 | 5 | 7 |
| 29 | T28 | 45 | 15 | B-1 | 100 | C-1 | 5 | A-8 | 30 | 5 | 7 |
| Comparative Example: | | | | | | | | | | | |
| 9 | H9 | 45 | 15 | b-2 | 100 | C-1 | 5 | A-1 | 30 | 5 | 7 |
| 10 | H10 | 45 | 15 | B-1 | 100 | C-1 | 5 | a-1 | 30 | 5 | 7 |

UPP: Unevenness-providing particles
PR: Physical properties; LT: layer thickness

TABLE 18

LBP5000 Evaluation Results

| | | Image density | | | | Wear | | |
|---|---|---|---|---|---|---|---|---|
| | | L/L | N/N | H/H | After leaving for 10 days in H/H | HT mist L/L | depth (μm) | Ra (μm) |
| Example: | | | | | | | | |
| 23 | INS | 1.45 | 1.45 | 1.44 | | OK | 0.5 | 0.51 |
| | AFR | 1.44 | 1.45 | 1.44 | 1.44 | OK | | 0.51 |
| | Dc % | 0.7 | 0.0 | 0.0 | 0.0 | | | |
| 24 | INS | 1.46 | 1.44 | 1.43 | | OK | 0.5 | 0.52 |
| | AFR | 1.45 | 1.43 | 1.41 | 1.41 | OK | | 0.51 |
| | Dc % | 0.7 | 0.7 | 1.4 | 1.4 | | | |
| 25 | INS | 1.46 | 1.44 | 1.43 | | OK | 0.8 | 0.53 |
| | AFR | 1.46 | 1.43 | 1.41 | 1.40 | OK | | 0.51 |
| | Dc % | 0.0 | 0.7 | 1.4 | 2.1 | | | |
| 26 | INS | 1.43 | 1.43 | 1.41 | | OK | 1.9 | 0.56 |
| | AFR | 1.43 | 1.42 | 1.39 | 1.38 | OK | | 0.49 |
| | Dc % | 0.0 | 0.7 | 1.4 | 2.1 | | | |
| 27 | INS | 1.45 | 1.43 | 1.42 | | OK | 0.6 | 0.50 |
| | AFR | 1.44 | 1.42 | 1.41 | 1.41 | OK | | 0.49 |
| | Dc % | 0.7 | 0.7 | 0.7 | 0.7 | | | |
| 28 | INS | 1.45 | 1.45 | 1.44 | | OK | 0.7 | 0.50 |
| | AFR | 1.44 | 1.44 | 1.43 | 1.41 | OK | | 0.49 |
| | Dc % | 0.7 | 0.7 | 0.7 | 2.1 | | | |
| 29 | INS | 1.45 | 1.44 | 1.43 | | OK | 0.8 | 0.52 |
| | AFR | 1.43 | 1.43 | 1.41 | 1.41 | OK | | 0.50 |
| | Dc % | 1.4 | 0.7 | 1.4 | 1.4 | | | |
| Comparative Example: | | | | | | | | |
| 9 | INS | 1.38 | 1.35 | 1.34 | | NG | 1.2 | 0.53 |
| | AFR | 1.35 | 1.34 | 1.29 | 1.25 | NG | | 0.47 |
| | Dc % | 2.2 | 0.7 | 3.7 | 6.7 | | | |
| 10 | INS | 1.43 | 1.45 | 1.43 | | OK | 0.8 | 0.52 |
| | AFR | 1.40 | 1.44 | 1.39 | 1.38 | NG | | 0.50 |
| | Dc % | 2.1 | 0.7 | 2.8 | 3.5 | | | |

INS: Initial stage; AFR: After running; Dc %: percent of decrease in density

As is seen from the results shown in Table 18, in each Example, the production of the developer carrying member having the surface layer containing the specific azo metal complex compound, the quaternary ammonium salt, the resin with specific structure and the conductive particles has enabled the developer to maintain a stable triboelectric charge quantity without being triboelectrically charged in excess. Hence, this has made good evaluation results obtainable in running service. In particular, good evaluation results were obtainable when the azo metal complex compound represented by the formula (2) was used.

On the other hand, in Comparative Example 9, the resin used in the developer carrying member had none of structures with the —$NH_2$ group, the =NH group and the —NH-linkage, and hence the HT uniformity was seen to have lowered as being considered due to excess triboelectric charging of the developer. Comparative Example 10 is an example in which a complex compound different from the azo metal complex compound represented by the formula (1) was added. Since the azo metal complex compound represented by the formula (1) was not used, the HT mist was seen.

From the foregoing results, it is seen that the developer carrying member that can properly maintain the providing of triboelectric charges from the surface layer to the developer can be obtained by the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-239222, filed Oct. 31, 2011, which is hereby incorporated by reference herein in its entirety.

What is claimed is:

1. A developer carrying member comprising a substrate and a surface layer;
wherein:
the surface layer is a cured product of a resin composition containing a binder resin, conductive particles, a quaternary ammonium salt and an azo metal complex compound; and wherein:
the binder resin has, in a molecular structure thereof, at least one structure selected from the group consisting of an —$NH_2$ group, an =NH group and an —NH-linkage; and
the azo metal complex compound is a compound represented by the following formula (1):

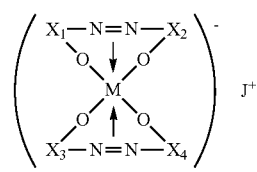

Formula (1)

where, in the formula (1), $X_1$, $X_2$, $X_3$ and $X_4$ each independently represent a substituted or unsubstituted phenylene group, a substituted or unsubstituted naphthylene group or a substituted or unsubstituted pyrazolene group; M represents Fe, Cr or Al; and $J^+$ represents a cation; where a substituent the phenylene group, the naphthylene group and the pyrazolene group may each independently have is at least one selected from the group consisting of an alkyl group having 1 to 18 carbon atom(s), a nitro group, a halogen atom, an anilide group which may have a substituent and a phenyl group which may have a substituent, where a substituent the anilide group and the phenyl group may each independently have is at least one selected from the group consisting of an alkyl group having 1 to 18 carbon atom(s) and a halogen atom.

2. The developer carrying member according to claim 1, wherein the azo metal complex compound is a compound represented by the following formula (2):

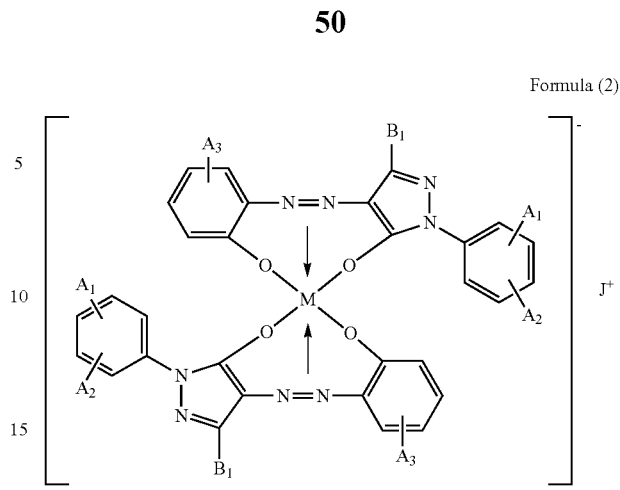

Formula (2)

where, in the formula (2), $A_1$, $A_2$ and $A_3$ each independently represent a hydrogen atom, an alkyl group having 1 to 18 carbon atom(s) or a halogen atom; $B_1$ represents a hydrogen atom or an alkyl group having 1 to 18 carbon atom(s); M represents Fe, Cr or Al; and $J^+$ represents a cation.

3. A developing assembly comprising:
a negatively chargeable developer,
a developer container in which the negatively chargeable developer is held,
a developer carrying member which is supported rotatably, and carries and transports the negatively chargeable developer thereon supplied from the developer container, and
a developer layer thickness regulating member for regulating the layer thickness of a negatively chargeable developer layer formed on the developer carrying member; wherein,
the developer carrying member is the developer carrying member according to claim 1.

4. The developing assembly according to claim 3, wherein;
the developer is a magnetic one-component developer;
a magnet is provided in the interior of the developer carrying member; and
the developer layer thickness regulating member is a magnetic blade.

5. The developing assembly according to claim 3, wherein;
the developer is a magnetic one-component developer;
a magnet is provided in the interior of the developer carrying member; and
the developer layer thickness regulating member is an elastic blade.

6. The developing assembly according to claim 3, wherein;
the developer is a non-magnetic one-component developer; and
the developer layer thickness regulating member is an elastic blade.

7. A process for producing a developer carrying member comprising a substrate and a surface layer; the process comprising the steps of:
forming on the substrate a coat of a coating material containing at least a binder resin having, in a molecular structure thereof, at least one structure selected from the group consisting of an —$NH_2$ group, an =NH group and an —NH-linkage, conductive particles, a quaternary ammonium salt and an azo metal complex compound represented by the following formula (1); and curing the coat to form the surface layer:

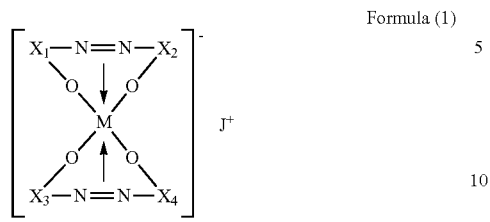

Formula (1)

where, in the formula (1), $X_1$, $X_2$, $X_3$ and $X_4$ each independently represent a substituted or unsubstituted phenylene group, a substituted or unsubstituted naphthylene group or a substituted or unsubstituted pyrazolene group; M represents Fe, Cr or Al; and $J^+$ represents a cation; where a substituent the phenylene group, the naphthylene group and the pyrazolene group may each independently have is at least one selected from the group consisting of an alkyl group having 1 to 18 carbon atom(s), a nitro group, a halogen atom, an anilide group which may have a substituent and a phenyl group which may have a substituent, where a substituent the anilide group and the phenyl group may each independently have is at least one selected from the group consisting of an alkyl group having 1 to 18 carbon atom(s) and a halogen atom.

\* \* \* \* \*